(12) United States Patent
Katzmann et al.

(10) Patent No.: US 12,118,717 B2
(45) Date of Patent: Oct. 15, 2024

(54) PROVIDING A CLASSIFICATION EXPLANATION AND A GENERATIVE FUNCTION

(71) Applicant: Siemens Healthcare AG, Forchheim (DE)

(72) Inventors: Alexander Katzmann, Fuerth (DE); Stephen Ahmad, Erfurt (DE); Michael Suehling, Erlangen (DE); Alexander Muehlberg, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 387 days.

(21) Appl. No.: 17/476,630

(22) Filed: Sep. 16, 2021

(65) Prior Publication Data

US 2022/0101521 A1 Mar. 31, 2022

(30) Foreign Application Priority Data

Sep. 28, 2020 (EP) .................................... 20198775

(51) Int. Cl.
*G06T 7/00* (2017.01)
*G06F 18/2431* (2023.01)
*G06N 3/045* (2023.01)

(52) U.S. Cl.
CPC ........ *G06T 7/0012* (2013.01); *G06F 18/2431* (2023.01); *G06N 3/045* (2023.01);
(Continued)

(58) Field of Classification Search
CPC ........ G06N 3/045; G06N 3/0454; G06N 3/04; G06T 7/0012; G06T 7/00;
(Continued)

(56) References Cited

U.S. PATENT DOCUMENTS

| 10,878,576 B2* | 12/2020 | Han .................. G06T 7/174 |
| 11,270,436 B2* | 3/2022 | Buerger .................. G06T 7/12 |
| 2021/0248736 A1 | 8/2021 | Kamen et al. |

FOREIGN PATENT DOCUMENTS

WO    WO 2019238804 A1    12/2019

OTHER PUBLICATIONS

Goodfellow, Ian J. et. al., "Generative Adversarial Networks", arXiv:1406.2661v1 of Jun. 10, 2014; XP055549980; pp. 1-9;.
(Continued)

*Primary Examiner* — Tuan H Nguyen
(74) *Attorney, Agent, or Firm* — Harness, Dickey & Pierce, P.L.C.

(57) ABSTRACT

A method is for providing a classification explanation. The method includes receiving an acquired medical image corresponding to an examination volume; and receiving or determining an actual classification value. The actual classification value classifies an anatomical structure within the acquired medical image. The method further includes receiving or determining a first classification value being different from the actual classification value, the first classification value being a potential classification value of the anatomical structure within the acquired medical image; applying a first generative function to the acquired medical image to generate a first synthetic image, the first generative function being based on the first classification value, and being configured to modify the anatomical structure to exhibit the first classification value; and providing a visualization based on the acquired medical image and the first synthetic image. Systems and computer programs are further for providing a classification explanation and/or generative functions.

21 Claims, 13 Drawing Sheets

(52) U.S. Cl.
CPC ............... *G06T 2207/20081* (2013.01); *G06T 2207/20084* (2013.01); *G06T 2207/30096* (2013.01)

(58) Field of Classification Search
CPC . G06T 2207/20081; G06T 2207/20084; G06T 2207/30096; G06F 18/2431; G06K 9/62
See application file for complete search history.

(56) References Cited

OTHER PUBLICATIONS

Zhu, Jun-Yan et.al.: "Unpaired Image-to-Image Translation using Cycle-Consistent Adversarial Networks", arXiv:1703.10593v6(cs.CV) Nov. 15, 2018.
American College Of Radiology:; "PI-RADS(TM) Prostate Imaging—Reporting and Data System"; XP055776054; URL: https://www.acr.org/-/media/ACR/Files/RADS/Pi-RADS/PIRADS-V2.pdf; 2015;.
Extended European Search Report dated Feb. 26, 2021.
Yi, X. et al. "Generative adversarial network in medical imaging: A review." Medical image analysis 58; published: Aug. 31, 2019; XP085878766.

* cited by examiner

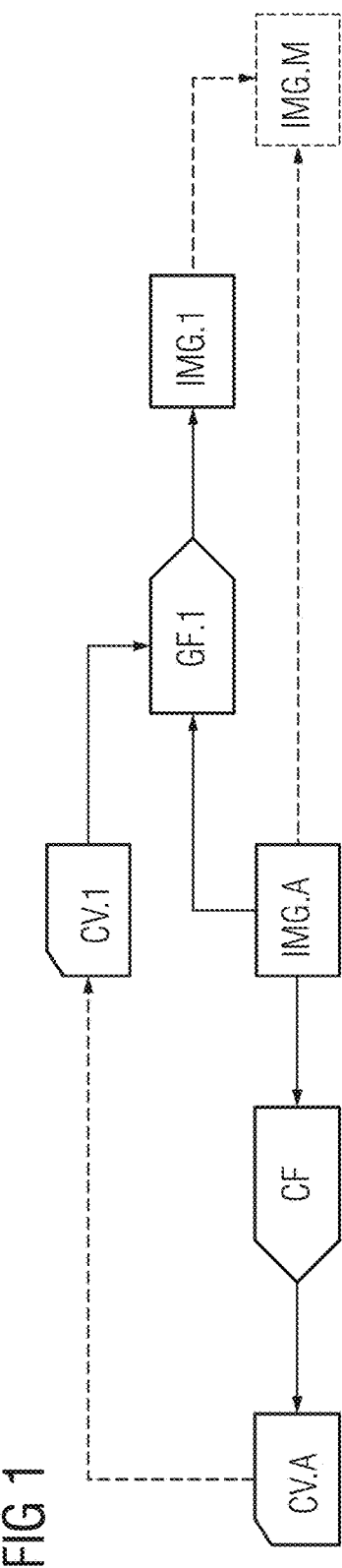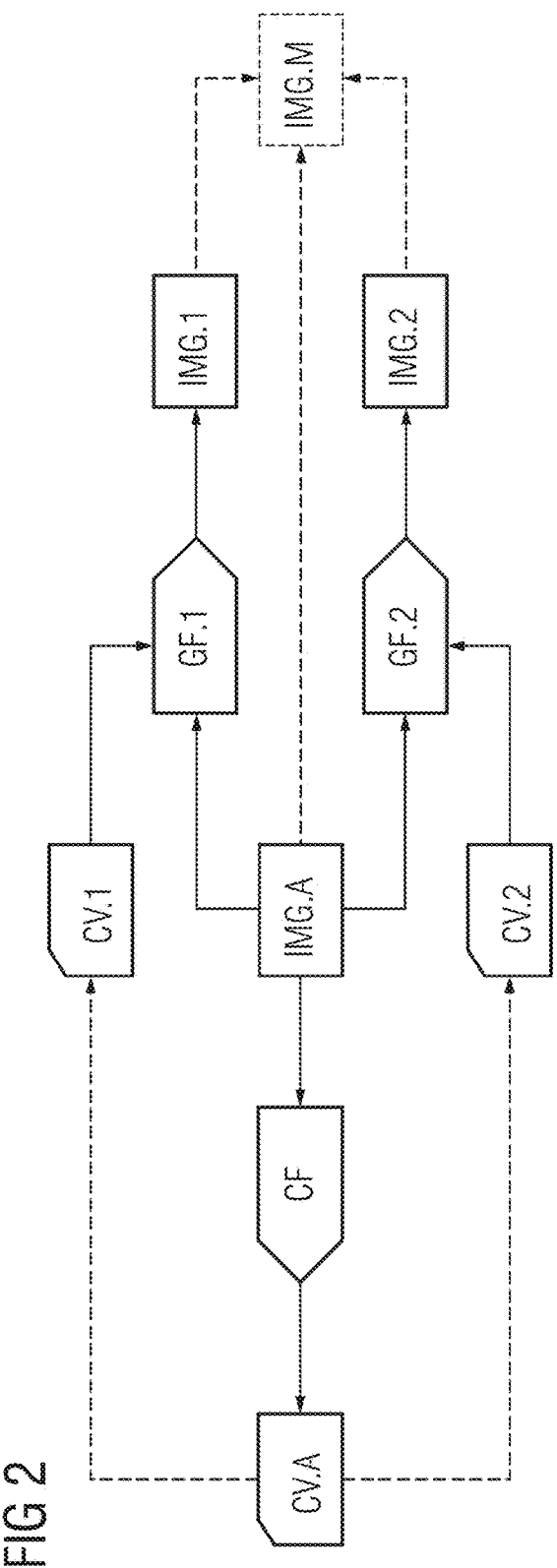

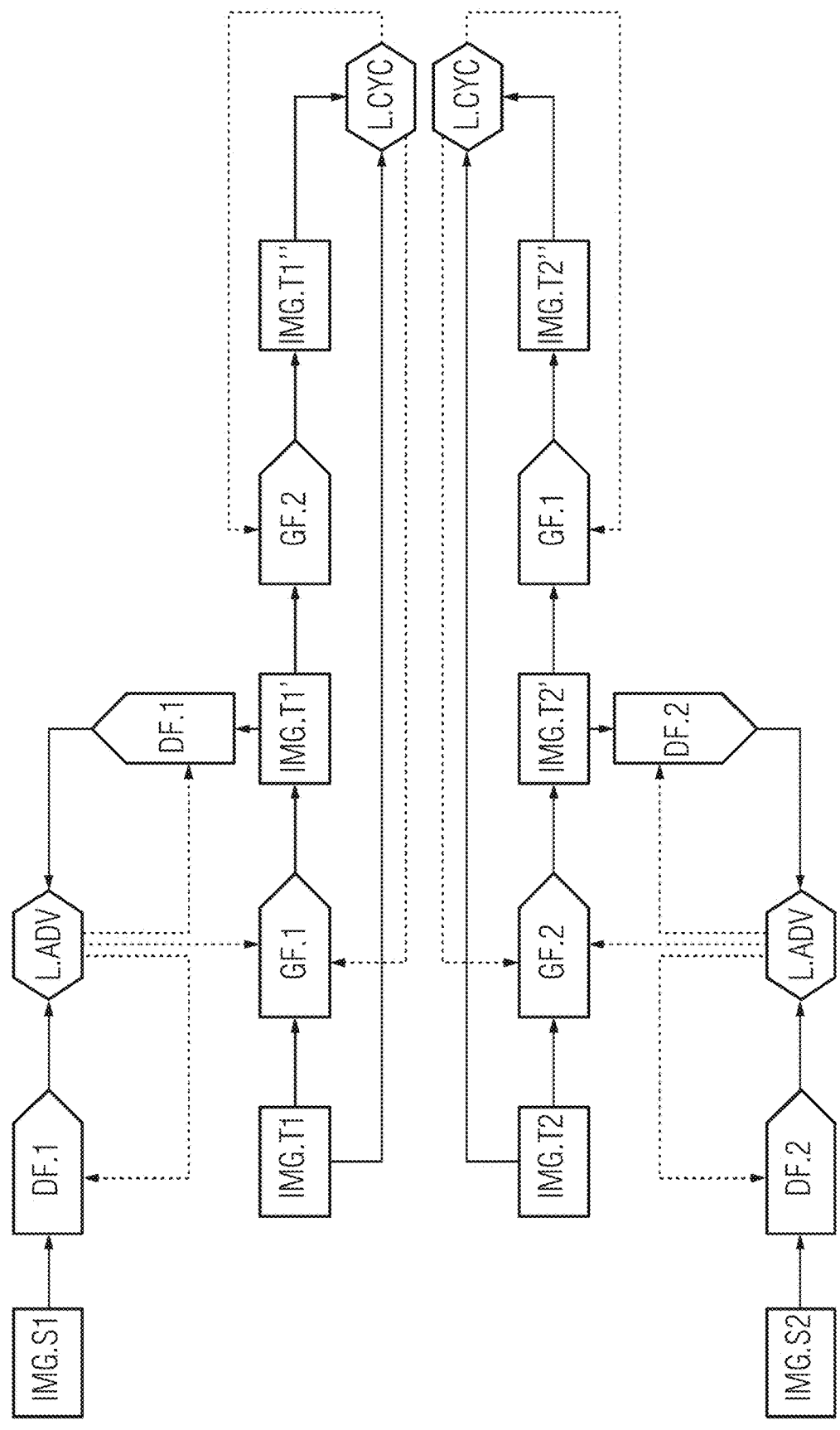

PROVIDING A CLASSIFICATION EXPLANATION AND A GENERATIVE FUNCTION

PRIORITY STATEMENT

The present application hereby claims priority under 35 U.S.C. § 119 to European patent application number EP20198775.7 filed Sep. 28, 2020, the entire contents of which are hereby incorporated herein by reference.

FIELD

Example embodiments of the invention generally relate to a method for providing a classification explanation and a generative function.

BACKGROUND

In recent years, clinical decision support using deep learning (DL) has become a major research topic. This comprises applications in microscopy, histopathology, time-continuous biosignal analysis and other types of medical image analysis, including magnetic resonance imaging (an acronym is "MRI"), positron emission tomography (an acronym is "PET") and computed tomography (an acronym is "CT"). While recent work has repeatedly demonstrated assessment performance on par or even beyond gold-standard human assessment, however, such tools are barely used in clinical practice. A major obstacle towards such an application lies in the fact that deep learning-based systems are generally considered to be incomprehensible and intransparent, raising questions of error-proneness and liability. Therefore, a system for automated decision explanation of deep learning-based systems would pose a major step towards a clinical application.

In the context of medical image classification, recent work has presented methods for explaining decisions. However, these methods create unsatisfactory results when employed on classifiers trained with few samples or samples of only low input resolution or quality. With respect to a variety of clinical tasks of tremendous importance, e.g. lung lesion malignancy estimation, this is the type of data which is typically faced.

Known methods from prior art can be categorized in model-dependent methods, comprising explicit modifications of the underlying model architecture, as well as model-agnostic methods, which work on mostly arbitrary architectures, backpropagating target class activations through the architecture back into the input space.

Well-known model-dependent solutions comprise Deconvolutional Networks (DeconvNet), (Gradient-based) Class Activation Mapping (CAM/GradCAM) or Attention Gated Networks. Model-dependent methods, however, generate only coarse, blob-like explanations, emphasizing only gross regions. Therefore, they do not allow for an identification of decision-relevant and clinically highly important fine structures like spiculation or vascularization in lung lesions.

Model-agnostic methods, on the other hand, include Layerwise Relevance Propagation (LRP). Local Interpretable Model-Agnostic Explanations (LIME), (Deep) Shapley Additive Explanations (SHAP/DeepSHAP) and variants (e.g. DeepTaylor), or (Deep) Learning Important Features (LIFT/DeepLIFT). Model-agnostic methods work by directly backpropagating decisions through the network. As deep neural networks apply a highly nonlinear decision function to the data, this backpropagation cannot be applied unambiguously. Therefore, all these methods apply an approximation based on assumptions on the visual meaningfulness of feature explanations, typically evaluating their results by employing user studies. These assumptions, however, do not necessarily hold, depending on the model architecture (e.g. with LRP). When applied to few data, or data of low quality or resolution, all above-mentioned methods create highly noisy explanations, which make an identification of decision-relevant regions highly difficult, and do not contribute to or even undermine the clinical acceptance.

SUMMARY

An embodiment of the present invention provides a better explanation of a result of a machine learning or deep learning algorithm, in particular, of classification results. Embodiments are directed to computer-implemented methods, systems, a computer-program product and by a computer-readable storage medium. Advantageous embodiments and additional features are presented in the claims as well as in the following specification.

In the following, embodiments of the invention are described with respect to the systems as well as with respect to the methods. Features, advantages or alternative embodiments herein can be assigned to the other corresponding claimed objects and vice versa. In other words, the systems can be improved with features described or claimed in the context of the corresponding method. In this case, the functional features of the methods are embodied by objective units of the systems.

Furthermore, embodiments of the invention are described with respect to methods and systems for providing classification explanations as well as with respect to methods and systems for providing generative functions used in the methods and systems for providing classification explanations. Features, advantages or alternative embodiments herein can be assigned to the other corresponding claimed objects and vice versa. In other words, methods and systems for providing classification explanations can be improved with features described or claimed in the context of the methods and systems for providing classification explanations. In particular, identical terms (potentially up to an additional adjective "training") can have the same features and embodiments in both types of methods and systems. According to a first embodiment, the invention relates to a computer-implemented method for providing a classification explanation, comprising receiving an acquired medical image corresponding to an examination volume.

According to a further possible embodiment of the invention relates to a computer-implemented method for providing a classification explanation, comprising:
  receiving an acquired medical image corresponding to an examination volume;
  applying a classification function to the acquired medical image, thereby generating an actual classification value classifying an anatomical structure within the acquired medical image;
  receiving or determining a first classification value being different from the actual classification value;
  wherein the first classification value is a potential classification value of the anatomical structure within the acquired medical image;
  applying a first generative function to the acquired medical image, thereby generating a first synthetic image, wherein the first generative function is based on the first classification value, wherein the first generative function is configured to modify the anatomical structure to exhibit the first classification value; and providing a visualization based on the acquired medical image and the first synthetic image.

According to a further possible embodiment the invention relates to a computer-implemented method for providing a classification explanation, comprising:

receiving an acquired medical image corresponding to an examination volume, the acquired medical image comprises an anatomical structure, in particular wherein the anatomical structure is classified by an actual classification value;

receiving a first classification value, wherein the first classification value is a potential classification value of the anatomical structure within the acquired medical image;

applying a first generative function to the acquired medical image, thereby generating a first synthetic image, wherein the first generative function is based on the first classification value, wherein the first generative function is configured to modify the anatomical structure to exhibit the first classification value; and providing a visualization based on the acquired medical image and the first synthetic image.

According to a second embodiment, the invention relates to an explanation system for providing a classification explanation, comprising an input interface, an output interface and a computation unit, wherein the input interface is configured for receiving an acquired medical image corresponding to an examination volume, wherein the input interface and/or the computation unit are configured for receiving or determining an actual classification value, in particular by applying a classification function to the acquired medical image to generate the actual classification value, wherein the actual classification value classifies an anatomical structure within the acquired medical image, wherein the input interface or the computation unit are configured for receiving or determining a first classification value being different from the actual classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

According to a further embodiment, the invention relates to an explanation system for providing a classification explanation, comprising an input interface, an output interface and a computation unit, wherein the input interface is configured for receiving an acquired medical image corresponding to an examination volume, wherein the computation unit is configured for applying a classification function to the acquired medical image, thereby generating an actual classification value classifying an anatomical structure within the acquired medical image, wherein the input interface and/or the computation unit are configured for receiving or determining a first classification value being different from the actual classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

According to a further embodiment, the invention relates to an explanation system for providing a classification explanation, comprising an input interface, an output interface and a computation unit, wherein the input interface is configured for receiving an acquired medical image corresponding to an examination volume, the acquired medical image comprises an anatomical structure, in particular wherein the anatomical structure is classified by an actual classification value, wherein the input interface is configured for receiving a first classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

According to a third embodiment, the invention relates to a medical imaging system comprising an explanation system according to an embodiment of the invention. In particular, a medical imaging system can be an X-ray imaging system, a computed tomography imaging system, a magnetic resonance imaging system, a PET imaging system, SPECT imaging system, and/or an ultrasound imaging system. Furthermore, a medical imaging system can be a microscopy imaging system, histopathology imaging system and/or a time-continuous biosignal analysis imaging system.

According to a fourth embodiment, the invention relates to a computer-implemented method for providing a first generative function, comprising:

receiving a first training image, the first training image comprising a first training anatomical structure, the first training anatomical structure being classified by a first training classification value, receiving or determining a second training classification value being different from the first training classification value, wherein the second training classification value is a potential classification value of the first anatomical structure within the first training medical image, applying a first generative function to the first training image, thereby generating a modified first training image, wherein the first generative function is based on the second training classification value, receiving a first input image, the first input image comprising a first input anatomical structure, the first input anatomical structure being classified by the second training classification value, applying a first discriminative function to the first input image, thereby generating a first discriminator value, applying the first discriminative function to the modified first training image, thereby generating a second discriminator value, adapting a parameter of the first generative function and/or of the first discriminative function based on an generative-adversarial loss function, wherein the generative-adversarial loss function is based on the first discriminator value and the second discriminator value, providing the first generative function and/or the first discriminative function.

According to a further embodiment, the invention relates to a training system for providing a first generative function, comprising an input interface, an output interface and a computation unit, wherein the input interface is configured for receiving a first training image, the first training image comprising a first training anatomical structure, the first training anatomical structure being classified by a first training classification value, wherein the input interface and/or the computation unit are configured for receiving or determining a second training classification value being different from the first training classification value, wherein the second training classification value is a potential classification value of the first anatomical structure within the first training medical image, wherein the computation unit is configured for applying a first generative function to the first training image, thereby generating a modified first training image, wherein the first generative function is based on the second training classification value, wherein the input interface is configured for receiving a first input image, the first input image comprising a first input anatomical structure, the first input anatomical structure being classified by the second training classification value, wherein the computation unit is configured for applying a first discriminative function to the first input image, thereby generating a first discriminator value, wherein the computation unit is configured for applying the first discriminative function to the modified first training image, thereby generating a second discriminator value, wherein the computation unit is configured for adapting a parameter of the first generative function and/or of the first discriminative function based on an generative-adversarial loss function, wherein the generative-adversarial loss function is based on the first discriminator value and the second discriminator value, wherein the output interface is configured for providing TPROV the first generative function and/or the first discriminative function.

According to a further embodiment of the invention, in the method for providing a classification explanation according to the invention an its embodiments the first generative function and/or the second generative function have been provided by a method for providing a first generative function according to the invention and its embodiments.

According to a further embodiment, the invention relates to a system comprising an explanation system according to an embodiment of the invention and its embodiments or a medical imaging system according to the invention and its embodiments, and a training system according to an embodiment of the invention and its embodiments, wherein the first generative function provided by the training system is used within the explanation system.

According to a further embodiment, the invention relates to a computer program or computer program product comprising instructions which, when the program is executed by an explanation system, cause the explanation system to carry out the method for providing a classification explanation according to the invention and its embodiments.

According to a further embodiment, the invention relates to a computer-readable medium comprising instructions which, when executed by an explanation system, cause the explanation system to carry out the method for providing a classification explanation according to the invention and its embodiments.

According to a further embodiment, the invention relates to a computer program or computer program product comprising instructions which, when the program is executed by a training system, cause the training system to carry out the method for providing a first generative function according to the invention and its embodiments.

According to a further embodiment, the invention relates to a computer-readable medium comprising instructions which, when executed by a training system, cause the training system to carry out the method for providing a first generative function according to the invention and its embodiments.

According to a further embodiment, the invention relates to a computer-implemented method for providing a classification explanation, comprising:

receiving an acquired medical image corresponding to an examination volume;

receiving or determining an actual classification value, the actual classification value classifying an anatomical structure within the acquired medical image;

receiving or determining a first classification value, different from the actual classification value, the first classification value being a potential classification value of the anatomical structure within the acquired medical image;

applying a first generative function to the acquired medical image to generate a first synthetic image, the first generative function being based on the first classification value and the first generative function being configured to modify the anatomical structure to exhibit the first classification value; and providing a visualization based on the acquired medical image and the first synthetic image.

According to a further embodiment, the invention relates to an explanation system for providing a classification explanation, comprising:

an input interface configured to receive an acquired medical image corresponding to an examination volume;

a computation device including at least one processor, wherein at least one of the input interface and the computation unit device is configured to receive or determine an actual classification value, the actual classification value classifying an anatomical structure within the acquired medical image, wherein at least one of the input interface and the computation device are configured to receive or determine a first classification value, different from the actual classification value, the first classification value being a potential classification value of the anatomical structure within the acquired medical image, wherein the computation device is configured to apply a first generative function to the acquired medical image to generate a first synthetic image, the first generative function being based on the first classification value and being configured to modify the anatomical structure to exhibit the first classification value; and an output interface configured to provide a visualization based on the acquired medical image and the first synthetic image.

According to a further embodiment, the invention relates to a computer-implemented method for providing a first generative function, comprising:

receiving a first training image including a first training anatomical structure, the first training anatomical structure being classified by a first training classification value;

receiving or determining a second training classification value, different from the first training classification value, the second training classification value being a potential classification value of the first anatomical structure within the first training medical image;

applying a first generative function to the first training image to generate a modified first training image, the first generative function being based on the second training classification value;

receiving a first input image, the first input image including a first input anatomical structure, the first input anatomical structure being classified by the second training classification value;

applying a first discriminative function to the first input image to generate a first discriminator value;

applying the first discriminative function to the modified first training image to generate a second discriminator value;

adapting a parameter of at least one of the first generative function and the first discriminative function, based on an generative-adversarial loss function, the generative-adversarial loss function being based on the first discriminator value and the second discriminator value; and providing at least one of the first generative function and the first discriminative function.

According to a further embodiment, the invention relates to a non-transitory computer-readable medium storing instructions which, when the program is executed by an explanation system, cause the explanation system to carry out the method of an embodiment, and/or comprising instructions which, when the program is executed by a training system, cause the training system to carry out the method according to an embodiment.

BRIEF DESCRIPTION OF THE DRAWINGS

The properties, features and advantages of this invention described above, as well as the manner they are achieved, become clearer and more understandable in the light of the following description and embodiments, which will be described in detail in the context of the drawings. This following description does not limit the invention on the contained embodiments. Same components or parts can be labeled with the same reference signs in different figures. In general, the figures are not for scale.

The numbering and/or order of method steps is intended to facilitate understanding and should not be construed, unless explicitly stated otherwise, or implicitly clear, to mean that the designated steps have to be performed according to the numbering of their reference signs and/or their order within the figures. In particular, several or even all of the method steps may be performed simultaneously, in an overlapping way or sequentially.

Figure 3:
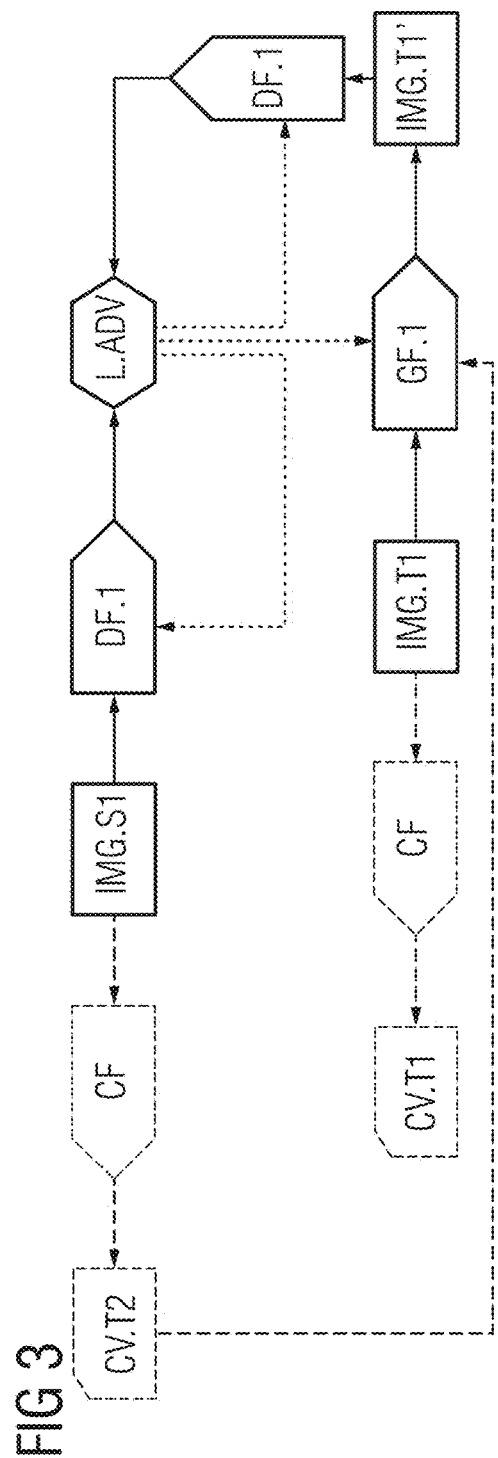
Figure 4:
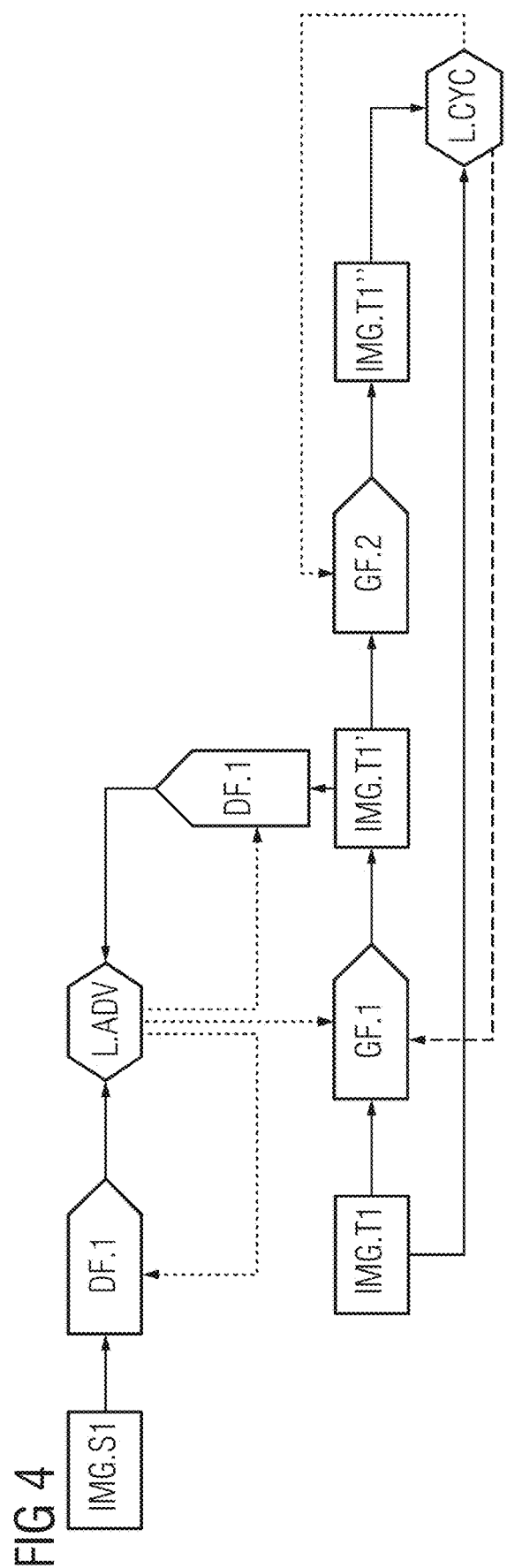
Figure 8:
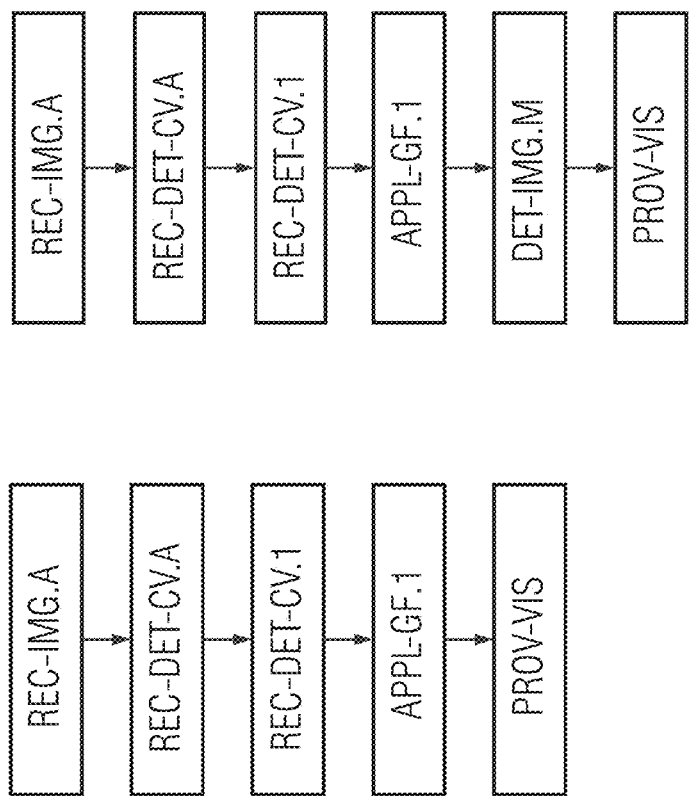
Figure 7:
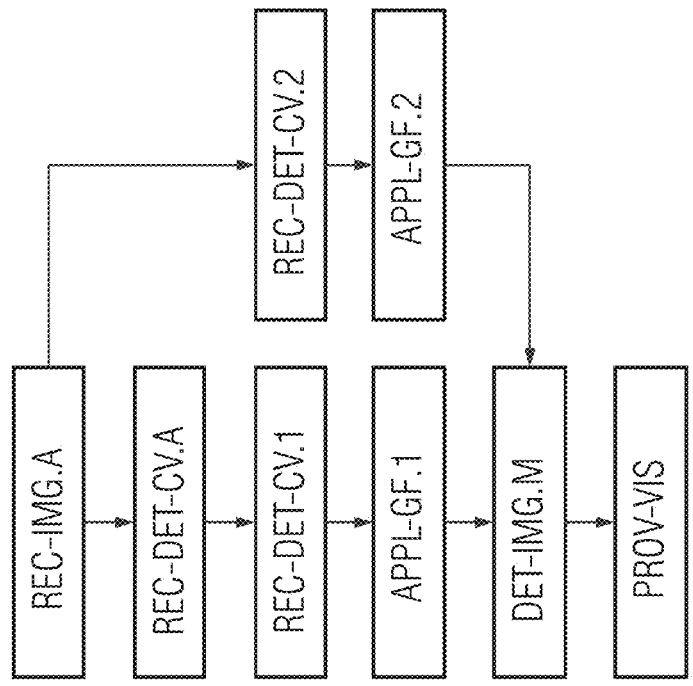
Figure 6:
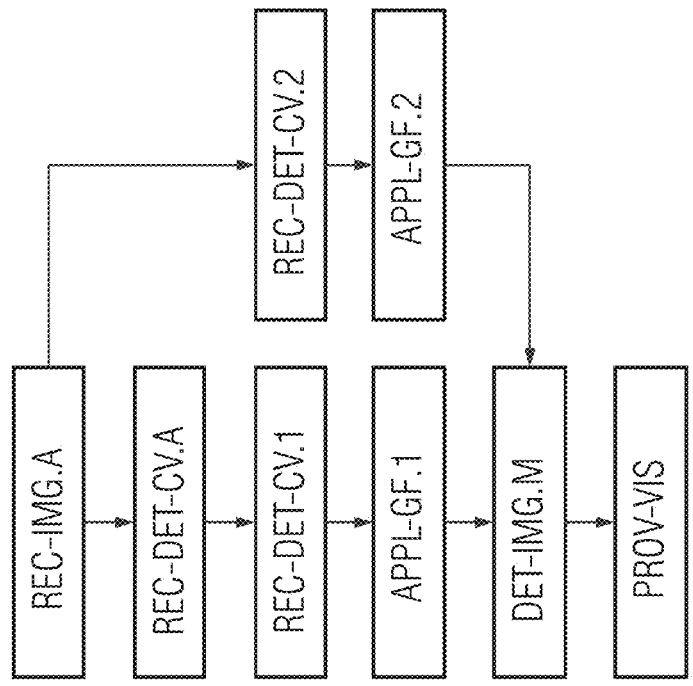
Figure 9:
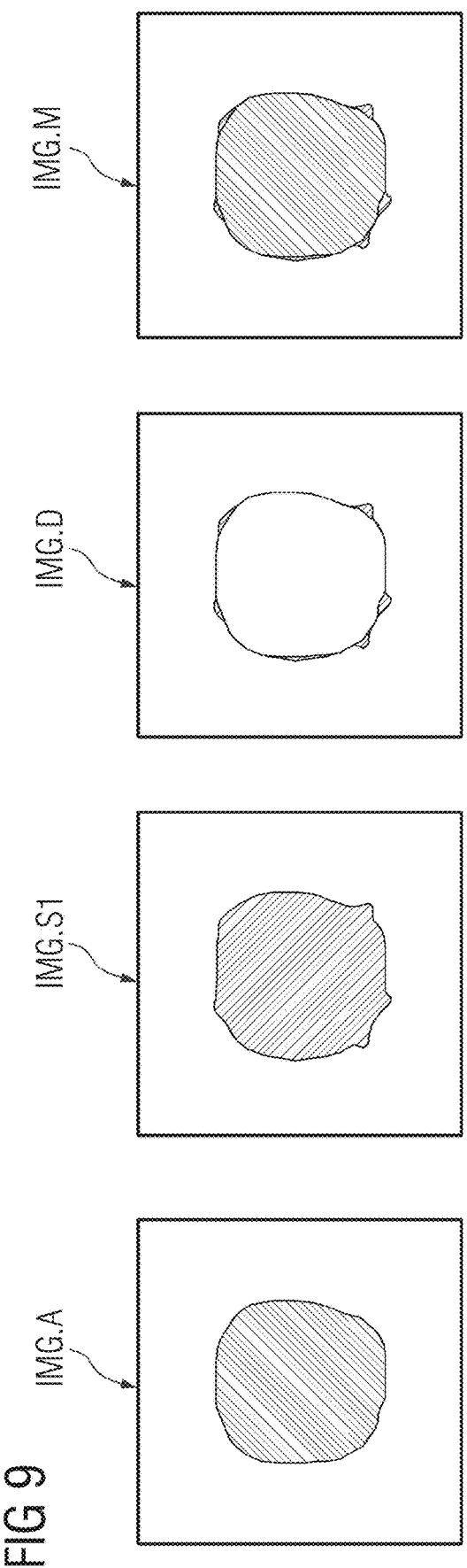
Figure 10:
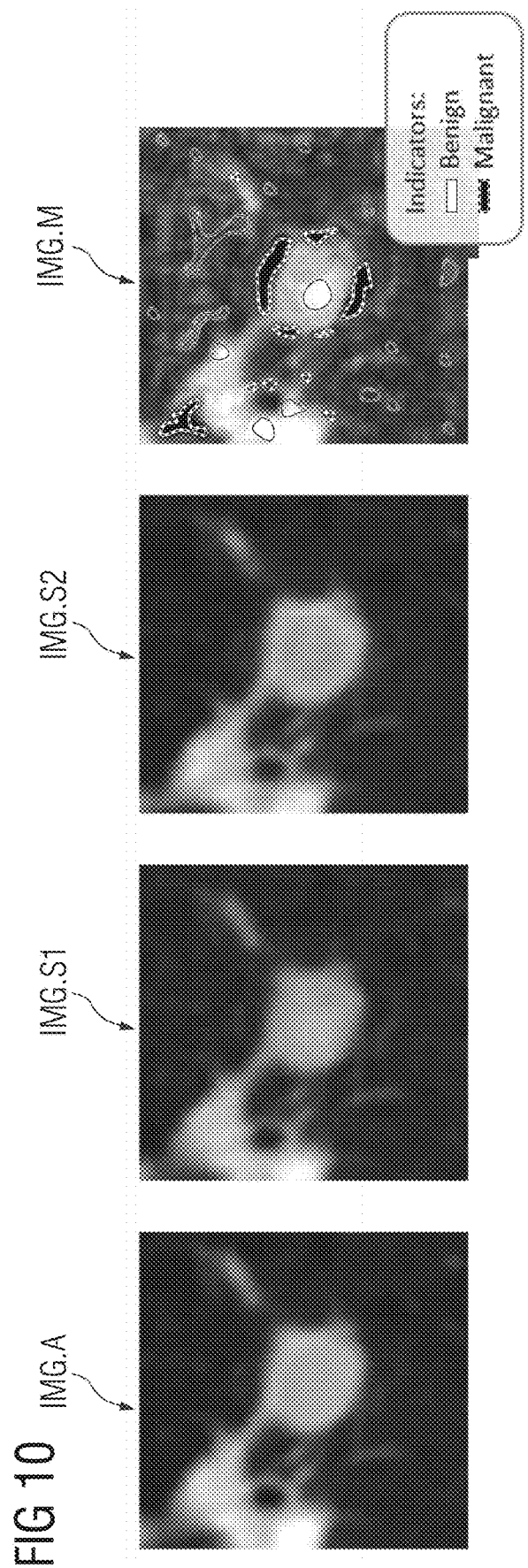
Figure 11:
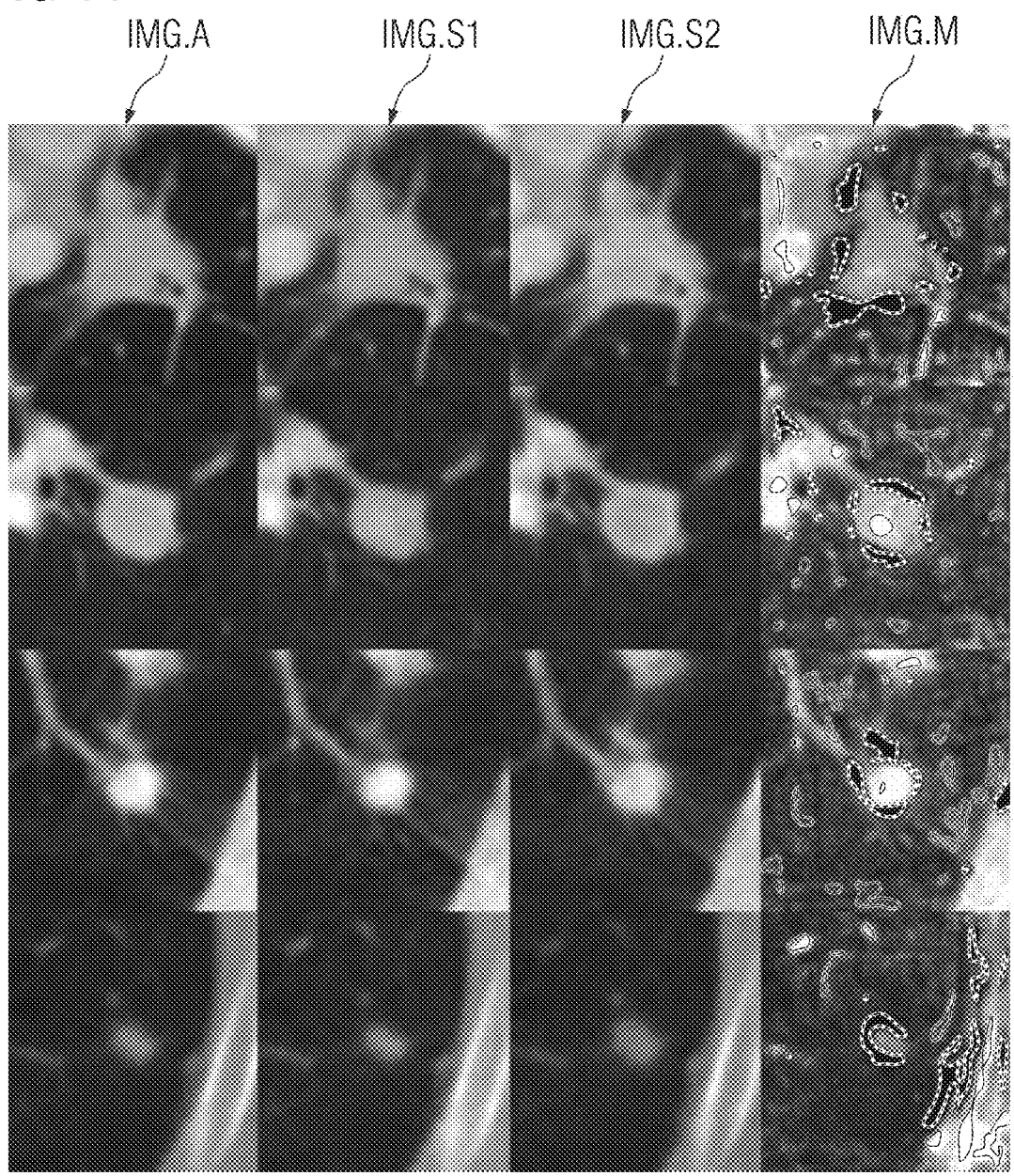
Figure 12:
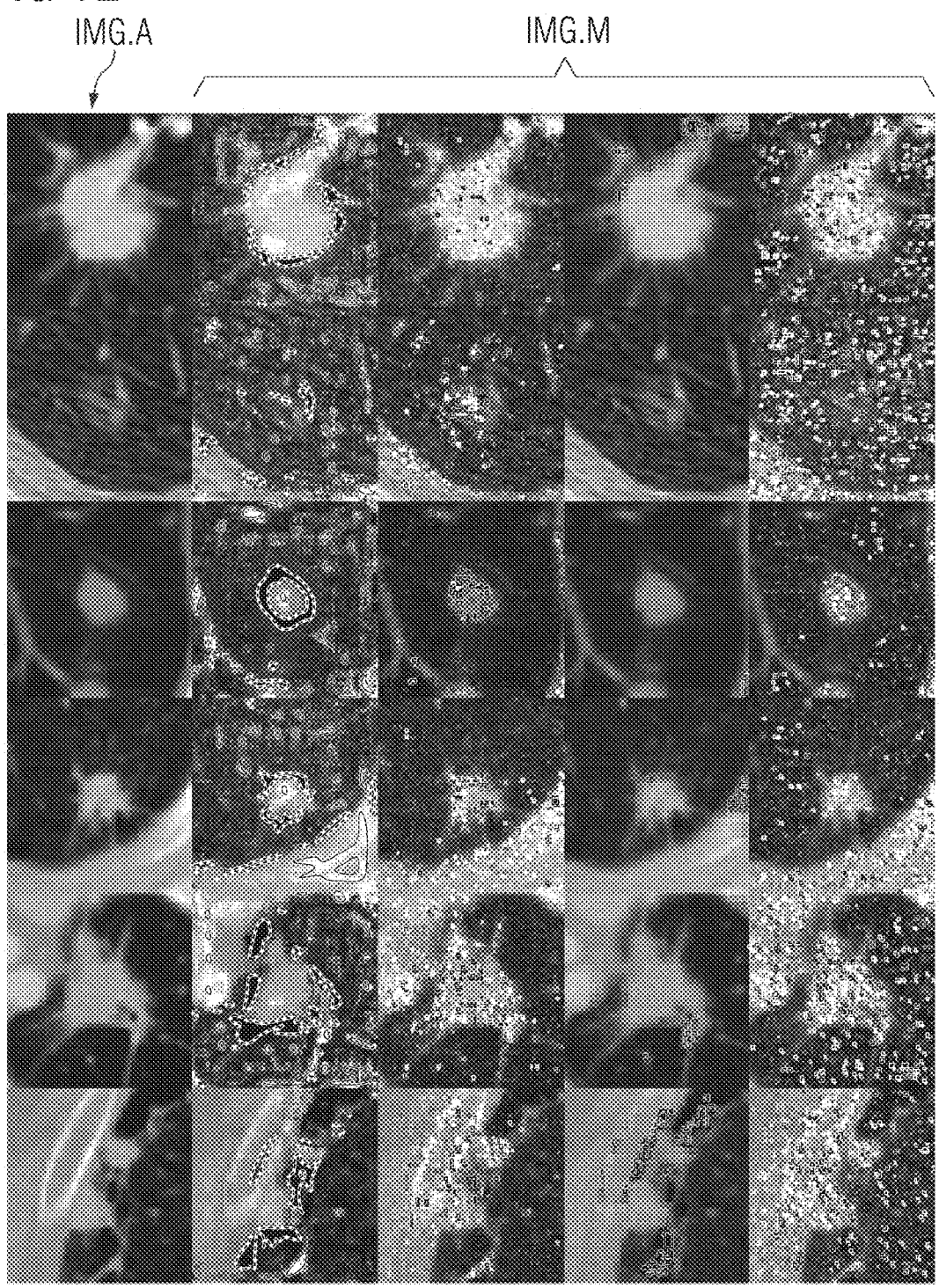
Figure 13:
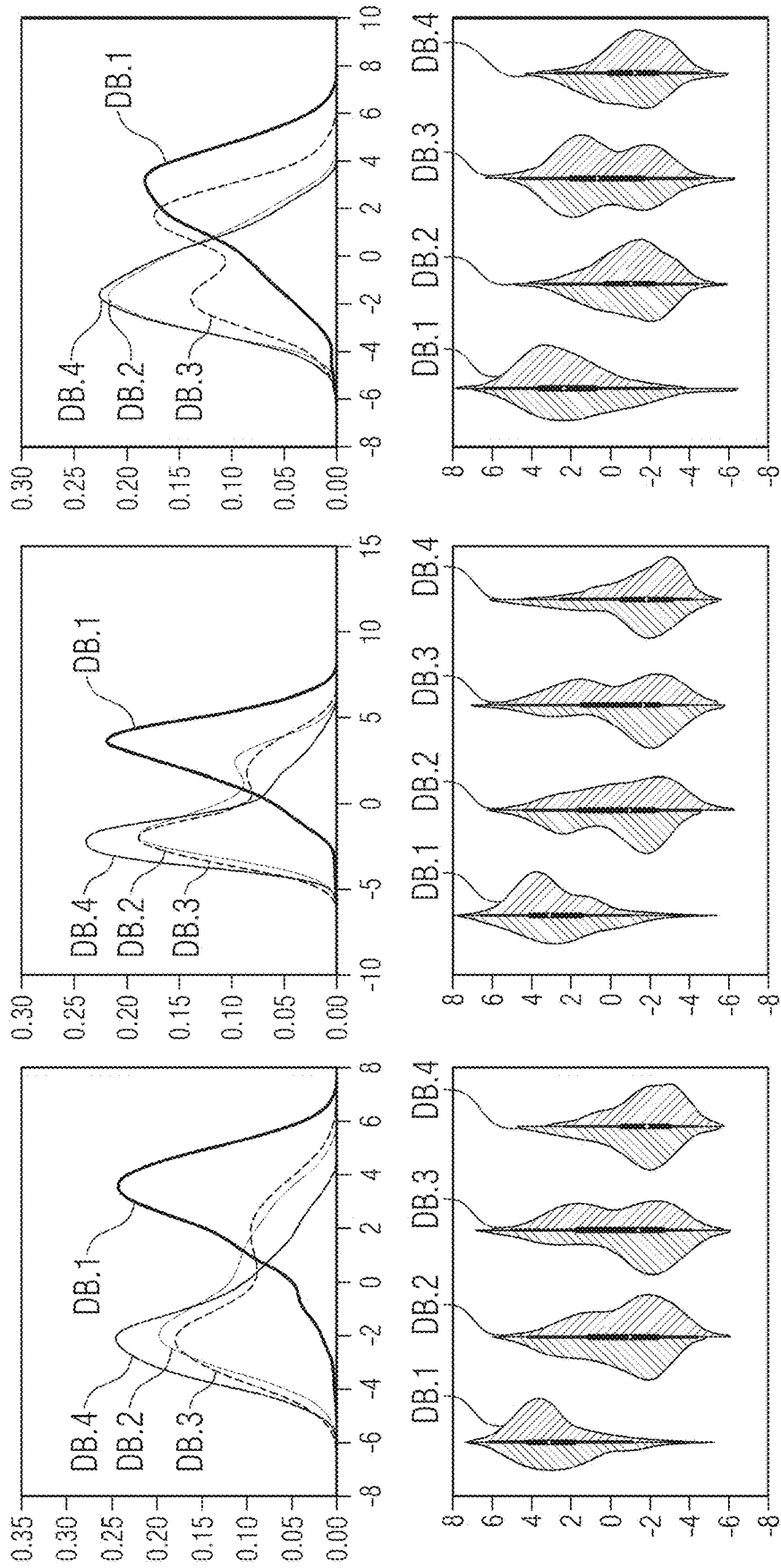
Figure 15:
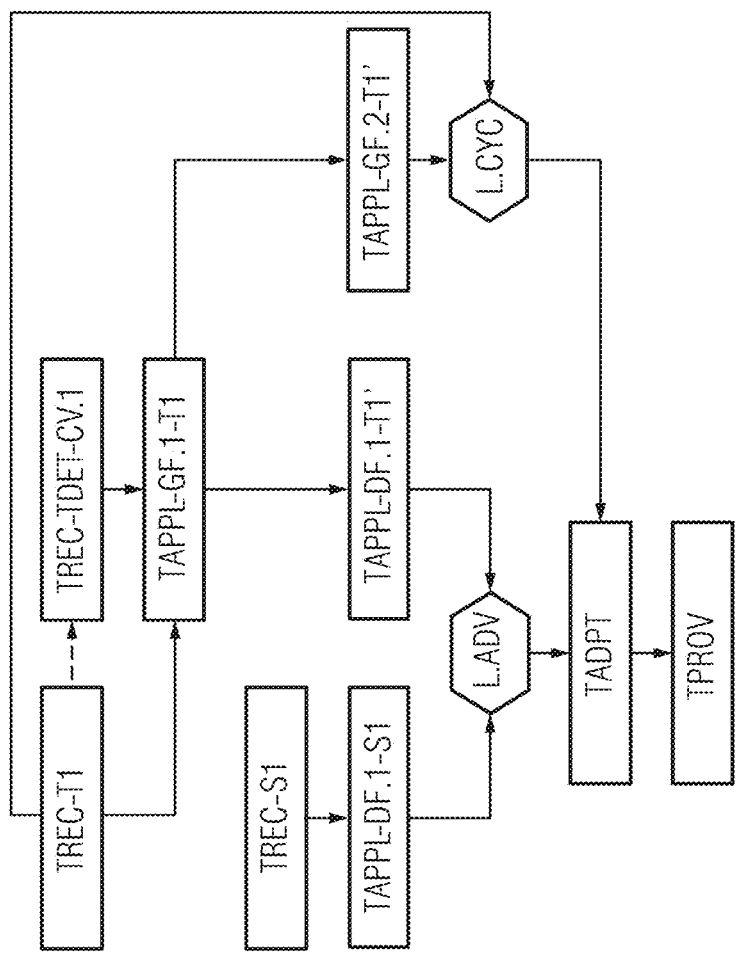
Figure 14:
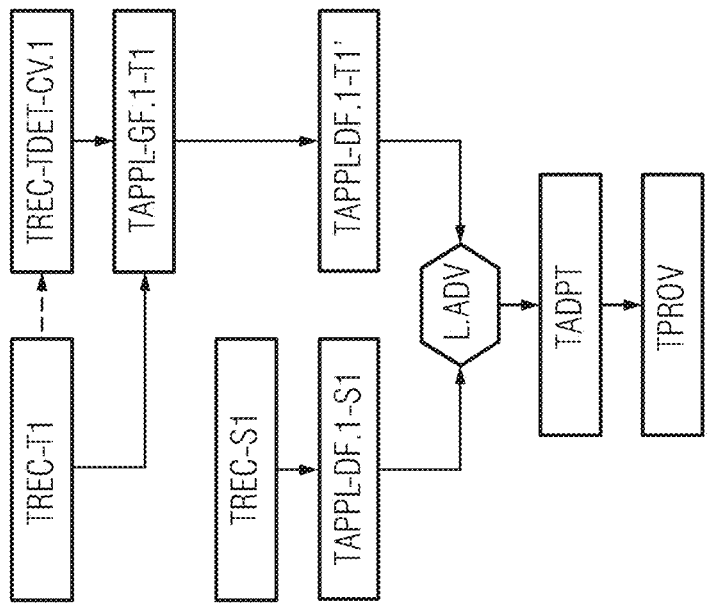
Figure 16:
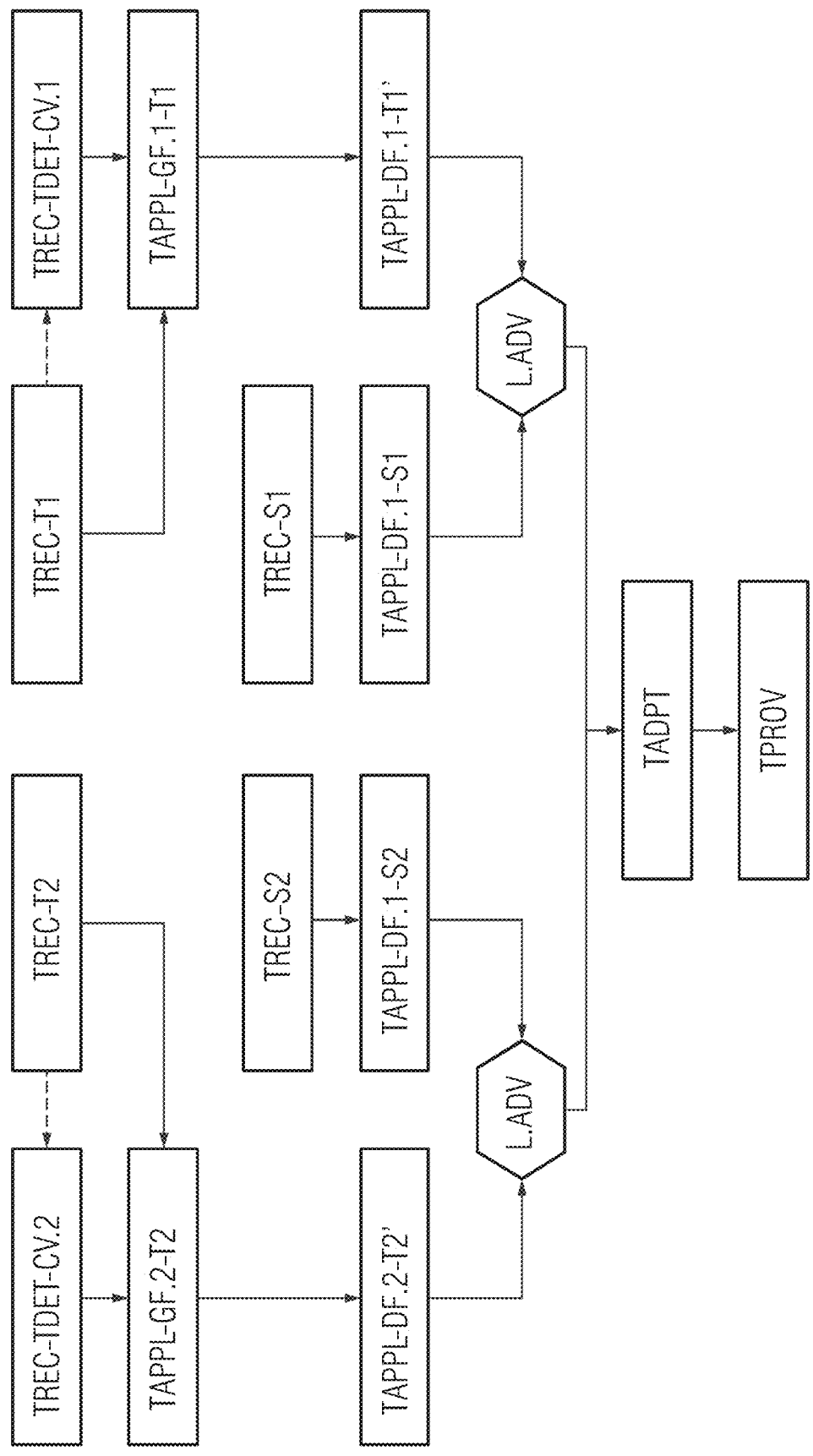
Figure 17:
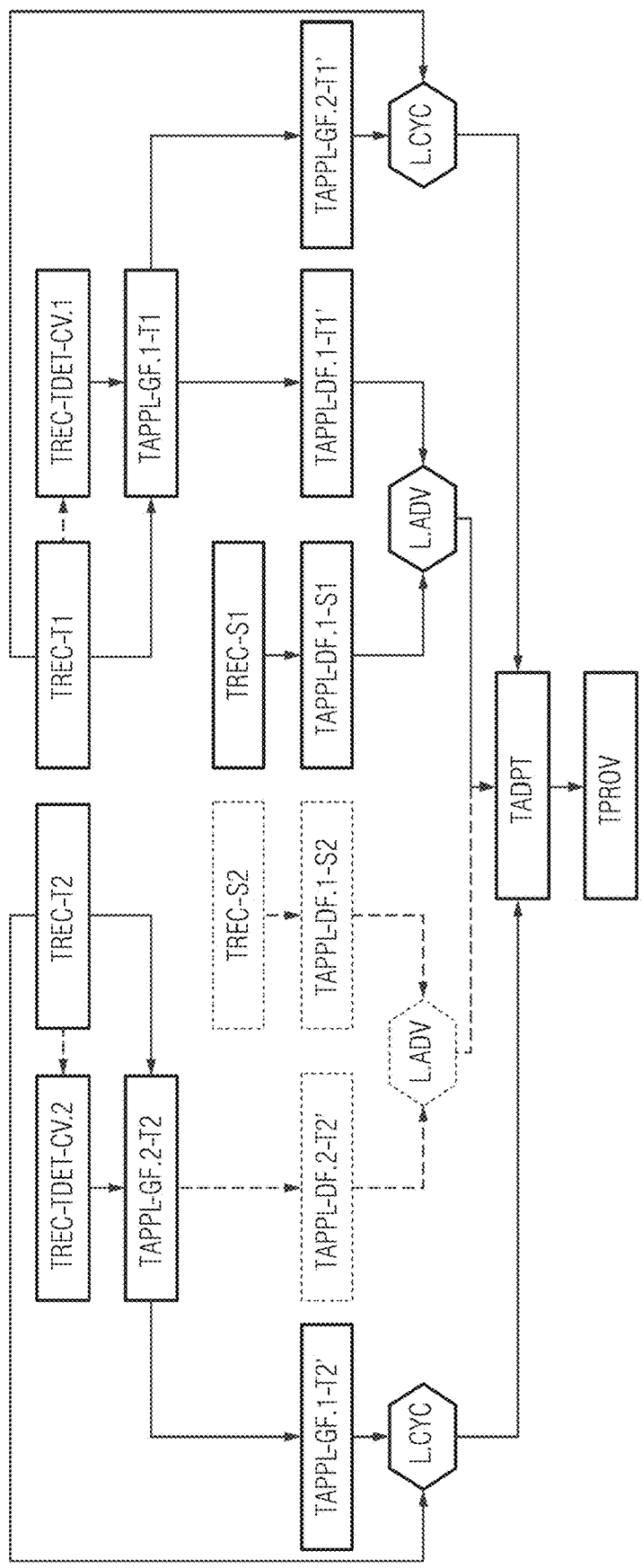
Figure 18:
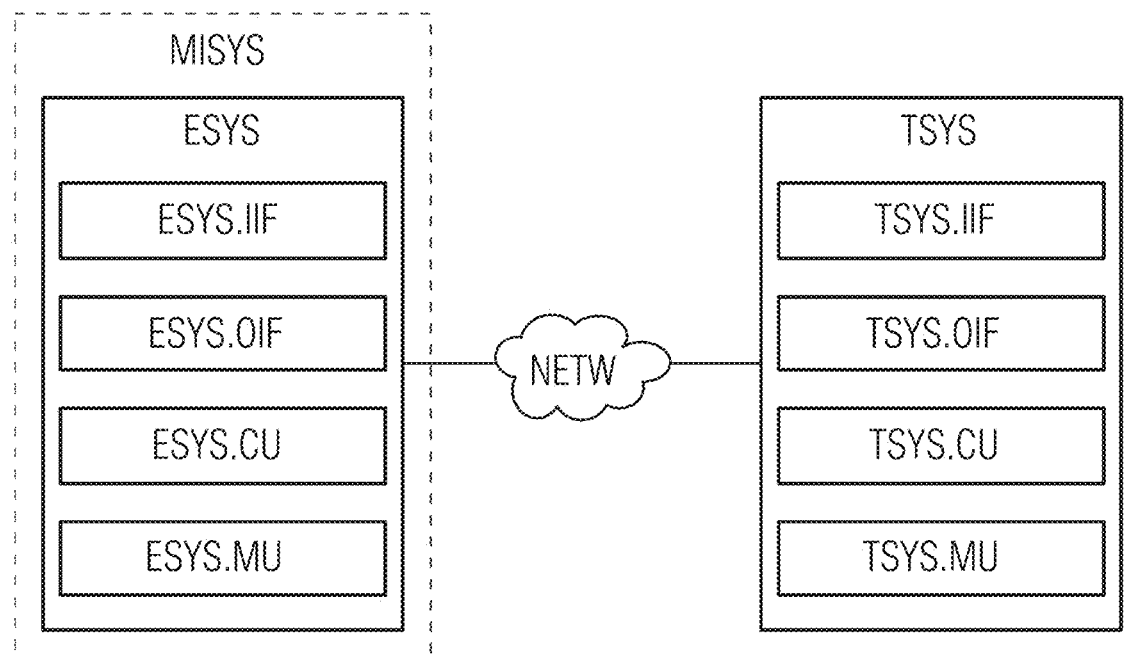

In the following:

FIG. 1 displays a first data flow diagram according to embodiments of the invention, FIG. 2 displays a second data flow diagram according to embodiments of the invention, FIG. 3 displays a first data flow diagram related to embodiments of the invention for providing a first generative function, FIG. 4 displays a second data flow diagram related to embodiments of the invention for providing a first generative function, FIG. 5 displays a third data flow diagram related to embodiments of the invention for providing a first generative function, FIG. 6 displays a first embodiment of the method for providing a classification explanation according to the invention, FIG. 7 displays a second embodiment of the method for providing a classification explanation according to the invention, FIG. 8 displays a third embodiment of the method for providing a classification explanation according to the invention, FIG. 9 schematically displays a potential outcome of a method for providing a classification explanation, FIG. 10 displays a further potential outcome of a method for providing a classification explanation, FIG. 11 displays a further potential outcome of a method for providing a classification explanation, FIG. 12 displays a comparison of different generative functions being used in the context of embodiments of the invention, FIG. 13 displays results of a study comparing the results of the proposed method based on different types of generative functions, FIG. 14 displays a flowchart of a first embodiment of a method for providing a first generative function, FIG. 15 displays a flowchart of a second embodiment of a method for providing a first generative function, FIG. 16 displays a flowchart of a third embodiment of a method for providing a first generative function, FIG. 17 displays a flowchart of a fourth embodiment of a method for providing a first generative function, FIG. 18 displays an explanation system, a medical imaging system and a training system.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be rearranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, the invention relates to a computer-implemented method for providing a classification explanation, comprising receiving an acquired medical image corresponding to an examination volume.

Furthermore, an actual classification value is received or determined. Herein, the actual classification value classifies an anatomical structure within the acquired medical image. In particular, the actual classification value can be determined by applying a classification function to the acquired medical image. In other words, the actual classification value is based on or identical with the output of the classification function when applied to the acquired medical image. In applying the classification function to the acquired medical image, there can be additional input data of the classification function.

A further step is receiving or determining a first classification value being different from the actual classification value, wherein the first classification value is a potential classification value of the structure within the acquired medical image. In other words, the first classification value is a potential output of the classification function. The first classification value can be based on the input of a user or of a system outside of the method, alternatively the first classification value can be determined without external input, in particular, the first classification value can be determined based on the actual classification value and/or the acquired medical image.

A further step of the method is applying a first generative function to the acquired medical image, thereby generating a first synthetic image, wherein the first generative function is based on the first classification value, and wherein the first generative function is configured to modify the anatomical structure to exhibit the first classification value. In other words, the first generative function is configured to generate a first synthetic image comprising a modified structure, the modified structure being a modification of the anatomical structure exhibiting the first classification value. In other words, the first generative function is configured to generate synthetic images comprising a synthetic structure, the synthetic structure being similar to the anatomical structure, but exhibiting the first classification value.

The last step of the method is providing a visualization based on the acquired medical image and the first synthetic image. The visualization can comprise a simultaneous display of the acquired medical image and the first synthetic image, in particular, wherein the acquired medical image and the first synthetic image are spatially aligned. The visualization can also comprise a modification of the acquired medical image based on the first synthetic image, or including additional elements (e.g. arrows or circles) within the acquired medical image based on the first synthetic image.

According to a further possible embodiment of the invention relates to a computer-implemented method for providing a classification explanation, comprising:
  receiving an acquired medical image corresponding to an examination volume;
  applying a classification function to the acquired medical image, thereby generating an actual classification value classifying an anatomical structure within the acquired medical image;
  receiving or determining a first classification value being different from the actual classification value, wherein the first classification value is a potential classification value of the anatomical structure within the acquired medical image;
  applying a first generative function to the acquired medical image, thereby generating a first synthetic image, wherein the first generative function is based on the first classification value,
  wherein the first generative function is configured to modify the anatomical structure to exhibit the first classification value; and
    providing a visualization based on the acquired medical image and the first synthetic image.

According to a further possible embodiment the invention relates to a computer-implemented method for providing a classification explanation, comprising:

receiving an acquired medical image corresponding to an examination volume, the acquired medical image comprises an anatomical structure, in particular wherein the anatomical structure is classified by an actual classification value;

receiving a first classification value, wherein the first classification value is a potential classification value of the anatomical structure within the acquired medical image;

applying a first generative function to the acquired medical image, thereby generating a first synthetic image, wherein the first generative function is based on the first classification value, wherein the first generative function is configured to modify the anatomical structure to exhibit the first classification value; and providing a visualization based on the acquired medical image and the first synthetic image.

In particular, the acquired medical image and the first synthetic image are medical images. In particular, a medical images is an X-ray image, a computed tomography image (acronym "CT image"), a magnetic resonance image (acronym "MR image"), a positron emission tomography image (acronym "PET image"), a single-photon emission computed tomography (acronym "SPECT image"), and/or an ultrasound image (acronym "US image"). Furthermore, a medical image can be a microscopy image, histopathology image and/or a time-continuous biosignal analysis image.

In particular, a medical image can be a two-dimensional image, a three-dimensional image or a four-dimensional image. In particular, within a four-dimensional image there are three spatial and one time dimensions.

A medical image can comprise a plurality of pixels or voxels, wherein the term "pixel" is mainly used for the building blocks of two-dimensional images, and the term is "voxel" is used for the building blocks of images with arbitrary dimension (mainly for three and more dimensions). In the following, the term "voxel" will be used as synonym for the term "pixel or voxel". Each voxel can comprise at least one intensity value.

A medical image can be identical with or encapsulated in one or more DICOM files. Whenever DICOM is mentioned herein, it shall be understood that this refers to the "Digital Imaging and Communications in Medicine" (DICOM) standard, for example according to the current DICOM PS3.1 2020c standard (or any later or earlier version of the standard). It is also possible that several medical images are encapsulated in a single DICOM file.

In particular, an acquired medical image is a medical image created by the use of a medical imaging apparatus. In particular, the acquired medical image corresponds to an examination volume (or region of interest) within the body of a patient. In particular, the intensity values of the voxels of the acquired medical image correspond to a physical property of tissue inside the examination volume or region of interest within the patient, up to measurement inaccuracy.

In particular, a synthetic image does not correspond to the examination volume (or region of interest) within the body of the patient. In particular, the intensity values of the voxels of the synthetic image do not directly correspond to a physical property pf tissue inside the examination volume of interest within the patient. A synthetic image is based on an acquired medical image and incorporates modifications of the acquired medical image. In particular, a synthetic image is similar to an acquired medical image, in particular, by the absolute difference between intensity values of corresponding voxels of the acquired medical image and the synthetic image not exceeding a predefined value and/or the ratio of the absolute difference and the respective intensity value of the acquired medical image not exceeding a predefined value.

In particular, the first synthetic image has the same dimension and the acquired medical image. On particular, if the acquired medical image is a two-dimensional image, the first synthetic image is a two-dimensional image; if the acquired medical image is a three-dimensional image, the first synthetic image is a three-dimensional image; and if the acquired medical image is a four-dimensional image, the first synthetic image is a four-dimensional image. In particular, the first synthetic image has the same size as the acquired medical image, wherein the size of a medical image correspond to the extension of the medical image measured in number of voxels with respect to every dimension.

In particular, an anatomical structure is complex anatomical part of the body of a patient. The terms "anatomical structure", "body structure" and "complex body part" can be used as synonyms. Examples for anatomical structures are organs, bones, joints, cartilage, muscles, vessels (e.g. blood vessels or lymph vessels), the brain, neoplasms (also denoted as "tumors", in particular, benign neoplasms, in situ neoplasms, malignant neoplasms and/or neoplasms of uncertain/unknown behavior), nodules, and/or parts of the aforementioned structures.

In particular, a classification value is related to a classification of an anatomical structure. In particular, for a given anatomical structure there are at least two possible classification values.

The plurality of possible classification values for an anatomical structure can be a finite set (i.e. there is a finite number of possible classification values, e.g. "true" and "false" or "benign" and "malignant"), discrete set (e.g. there are only countable many possible classification values, e.g. natural numbers) or a continuous set (e.g. a real number corresponding to the size of a certain anatomical structure).

The plurality of possible classification values for an anatomical structure can be comparable, i.e., for every pair of two of the possible classification value either the first classification value is smaller, equal or larger than the second classification value.

Nothing in this application should be understood to restrict a classification value to the result of the classification process in the sense of the opposite of a regression process. In particular, a classification value can be the result of a regression process. For example, a classification value could be an estimate for the weight of a patient based on a medical imaging dataset, e.g. a whole-body scan. Furthermore, nothing in this application should be understood to restrict a classification value to be a numerical value. In particular, a classification value can be given by a class label or by a vector comprising numerical values, or even an imaging dataset.

In particular, a classification function takes as input a medical image comprising an anatomical structure and gives as an output a classification value corresponding to the anatomical structure within the input medical image. In particular, a classification function can be a trained function.

For example, a classification function can be used to assess the malignancy of a neoplasm within a medical image. Other examples of possible classification function relate to survival estimation, brain hemorrhage detection or medical image segmentation.

In particular, a generative function takes as input a medical image (in particular, a acquired medical image), the medical image comprising an anatomical structure, and a classification value and generates as output a synthetic image. In particular, the generative function is configured to modify the anatomical structure such that the result of the classification function applied to the synthetic image results in the classification value used as input of the generative function. In particular, a generative function can be a trained function.

In general, a trained function mimics cognitive functions that humans associate with other human minds. In particular, by training based on training data the trained function is able to adapt to new circumstances and to detect and extrapolate patterns.

In general, parameters of a trained function can be adapted by way of training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

The inventor recognized that the described method provides high-quality, intuitively comprehensible decision explanations for classification decisions, improving the understanding of decision strategies. In particular, this allows a user to get understanding about the internal state of the decision system (or classification system) and to check the quality of the decision itself. Furthermore, the inventors recognized that for utilizing the described method there needs to be no direct access to the classification function. In particular, the described method can be used independently of the classification function and/or as a decision explanation for an externally given classification function.

In a double-blind, randomized in-house study, conducted with eight participants having multi-year experience in the field of biomedical image processing, the described approach significantly outperformed three approaches from state of the art (DeepSHAP, DeepTaylor, LRP) with respect to multiple tested criteria (intuitive impression, meaningfulness with respect to typical signs of lung lesion malignancy, and overall image quality).

According to a further possible embodiment of the invention the first generative function is based on the first classification value by the first classification value being used as an input parameter for the first generative function and/or by the first generative function being chosen from a plurality of generative functions based on the first classification value.

According to a further embodiment of the invention the method comprises the step of determining a modified medical image based on the acquired medical image and the first synthetic image. Furthermore, providing the visualization then comprises providing the modified medical image.

In particular, a modified medical image can comprise data from the acquired medical image and/or the first synthetic image. In particular, the modified medical image can comprise all intensities of voxels the acquired medical image, and/or additional data originating from the first synthetic image can be included as an overlay. For example, markers with locations based on the data originating from the first synthetic image (and optionally also the acquired medical image) can be included as overlay. Examples for such markers are arrows or bounding boxes.

In particular, the modified medical image has the same dimension and the acquired medical image. On particular, if the acquired medical image is a two-dimensional image, the modified medical image is a two-dimensional image; if the acquired medical image is a three-dimensional image, the modified medical image is a three-dimensional image; and if the acquired medical image is a four-dimensional image, the modified medical image is a four-dimensional image. In particular, the modified medical image has the same size as the acquired medical image, wherein the size of a medical image corresponds to the extension of the medical image measured in number of voxels with respect to every dimension.

The inventors recognized that by determining the modified medical image spatial correlations and/or deviations between the acquired medical image and the first synthetic image can be included into the visualization. In particular, areas of the acquired medical image corresponding to a low correlation and/or a high deviation can be directly marked. These areas correspond to areas where differences are to be expected for different classification values, so my marking those areas information about the areas that lead to a certain result of the classification function can be determined.

According to a further embodiment of the invention, the modified medical image is based on a difference of the first synthetic image and the acquired medical image. In particular, the modified medical image is based on the absolute value of a difference of the first synthetic image and the acquired medical image. In particular, the difference of the synthetic image and the acquired medical image is a voxel-wise difference of the intensity values of the respective voxels.

The inventors recognized that a higher value of such a difference correspond to larger deviations between the acquired medical image and the first synthetic image, implying a high influence of areas with those deviations on the outcome of the classification function.

According to a further embodiment of the invention, each voxel of the modified medical image comprises a first intensity value and a second intensity value. Herein, the first intensity value corresponds to an intensity value of a corresponding voxel of the acquired medical image, and the second intensity value corresponds to an intensity value of a corresponding voxel of the difference of the first synthetic image and the acquired medical image.

In particular, the first intensity values of the modified medical image can form a first color channel of the modified medical image, and the second intensity values of the modified medical image can form a second color channel of the modified medical image. In particular, the first color channel can correspond to a greyscale, wherein a high intensity value corresponds to white, a low intensity value corresponds to black, or vice versa, and an intermediate intensity value corresponds to black. In particular, the second color channel can correspond to a color scale between transparent and a predetermined color (e.g., the color red), wherein a low intensity value (corresponding to a small difference) corresponds to full transparency, and wherein a high intensity value (corresponding to a large difference) correspond to the predetermined color with no or less than full transparency.

The inventors recognized that by using two different intensity values within the modified medical image deviations between the first synthetic image and the acquired medical image (corresponding to regions that mostly influenced the outcome of the classification function) can be displayed in a fine-grained way. In particular, by using transparency for displaying second intensities the full information of the acquired medical image can be displayed in the visualization.

According to a further potential embodiment of the invention are the actual classification value and the first classification value comparable. In this embodiment either the first classification value is smaller than the actual classification value, or the first classification value is larger than the actual classification value.

In particular, two values are comparable if it can be determined whether the two values are equal, or which of the two values is smaller than the other one. In particular, a set of values is comparable of all pairs of its elements are comparable.

The inventors recognized that by using the proposed method on comparable classification values the decision explanation can also cover stepwise differences between the classification values.

According to a further embodiment of the invention, the actual classification value and the first classification value are elements of a plurality of possible classification values of the anatomical structure, the plurality of possible classification values being a discrete and comparable set.

Furthermore, the first classification value is the smallest classification value from the plurality of possible classification values being larger than the actual classification value, alternatively, the first classification value is the largest classification value from the plurality of possible classification values being smaller than the actual classification value. In other words, there is a minimal positive or negative difference between the actual classification value and the first classification value. In other words, the first classification value is next or a neighbor of the actual classification value.

In particular, within this embodiment, the first classification value is determined based on the actual classification value by finding the respective first classification value in the plurality of possible classification values.

The inventors recognized that by using first classification values being next to the actual classification value an explanation can be provided why the actual classification is not actually higher or lower than outputted by the classification function.

According to a further embodiment of the invention the method furthermore comprises receiving or determining a second classification value being different from the actual classification value and being different from the first classification value. Here, the second classification value is a potential classification value of the anatomical structure within the acquired medical image. The method furthermore comprises applying a second generative function to the acquired medical image, thereby generating a second synthetic image, wherein the second generative function is based on the second classification value, wherein the second generative function is configured to modify the anatomical structure to exhibit the first classification value. Furthermore, the visualization is furthermore based on the second synthetic image.

In particular, the second classification value can comprise all advantageous features and embodiments as described with respect to the first classification value. The second synthetic image can comprise all advantageous features and embodiments as described with respect to the second classification value.

The inventors realized that by using a second synthetic image based on a second classification values the output of the classification function can be explained with respect to two different factors, e.g. with respect to a higher and a lower classification value, or with respect to orthogonal embodiments of the plurality of classification values.

According to a further possible embodiment of the invention, the second generative function is based on the second classification value by the second classification value being used as an input parameter for the second generative function and/or by the second generative function being chosen from a plurality of generative functions based on the second classification value.

According to a further embodiment of the invention, the method comprises the step of determining a modified medical image based on the acquired medical image, the first synthetic image and the second synthetic image. Furthermore, providing the visualization then comprises providing the modified medical image.

In particular, the modified medical image can comprise data from the acquired medical image, the first synthetic image and/or the second synthetic image. In particular, the modified medical image can comprise all intensities of voxels the acquired medical image, and/or additional data originating from the first synthetic image and the second synthetic image can be included as an overlay. For example, markers with locations based on the data originating from the first synthetic image and/or the second synthetic image (and optionally also the acquired medical image) can be included as overlay. Examples for such markers are arrows or bounding boxes.

The inventors recognized that by determining the modified medical image spatial correlations and/or deviations between the acquired medical image, the first synthetic image and the second synthetic image can be included into the visualization. In particular, areas of the acquired medical image corresponding to a low correlation and/or a high deviation can be directly marked. These areas correspond to areas where differences are to be expected for different classification values, so my marking those areas information about the areas that lead to a certain result of the classification function can be determined.

According to a further embodiment of the invention the modified medical image is based on a difference of the first synthetic image and the acquired medical image, as well as on a difference of the second synthetic image and the acquired medical image. In particular, the modified medical image is based on the absolute value of a difference of the first synthetic image and the acquired medical image, as well as on the absolute value of a difference of the second synthetic image and the acquired medical image. In particular, the difference of the synthetic image and the acquired medical image is a voxel-wise difference of the intensity values of the respective voxels.

The inventors recognized that a higher value of such a difference correspond to larger deviations between the acquired medical image and the first synthetic image, implying a high influence of areas with those deviations on the outcome of the classification function.

According to a further embodiment of the invention, each voxel of the modified medical image comprises a first intensity value, a second intensity value and a third intensity value. Herein, the first intensity value corresponds to an intensity value of a corresponding voxel of the acquired medical image, the second intensity value corresponds to an intensity value of a corresponding voxel of the difference of the first synthetic image and the acquired medical image, and the third intensity value corresponds to an intensity value of a corresponding voxel of the difference of the second synthetic image and the acquired medical image.

In particular, the first intensity values of the modified medical image can form a first color channel of the modified medical image, the second intensity values of the modified medical image can form a second color channel of the modified medical image, and the third intensity values of the modified medical image can form a third color channel of the modified medical image. In particular, the first color channel can correspond to a greyscale, wherein a high intensity value corresponds to white, a low intensity value corresponds to black, or vice versa, and an intermediate intensity value corresponds to black. In particular, the second color channel can correspond to a color scale between transparent and a predetermined first color (e.g., the color red), wherein a low intensity value (corresponding to a small difference) corresponds to full transparency, and wherein a high intensity value (corresponding to a large difference) correspond to the predetermined first color with no or less than full transparency. In particular, the third color channel can correspond to a color scale between transparent and a predetermined second color (e.g., the color blue), wherein a low intensity value (corresponding to a small difference) corresponds to full transparency, and wherein a high intensity value (corresponding to a large difference) correspond to the predetermined second color with no or less than full transparency.

The inventors recognized that by using three different intensity values within the modified medical image deviations between the first synthetic image, the second synthetic image and the acquired medical image (corresponding to regions that mostly influenced the outcome of the classification function) can be displayed in a fine-grained way. In particular, by using transparency for displaying second intensities and third intensities the full information of the acquired medical image can be displayed in the visualization, furthermore small values of the second intensities do not hide large values of the third intensities and vice versa.

According to a further embodiment of the invention, the actual classification value, the first classification value and the second classification value are comparable. Furthermore, the first classification value is smaller than the actual classification value, and the second classification value is larger than the actual classification value.

The inventors recognized that by using a first classification value smaller than the actual classification value and a second classification value larger than the actual classification value a decision explanation or classification explanation can be given with respect to why the actual classification value is neither higher nor lower than actually classified.

According to a further embodiment of the invention, the actual classification value, the first classification value and the second classification value are elements of a plurality of possible classification values of the anatomical structure, the plurality of possible classification values being a discrete and comparable set. Here, the first classification value is the largest classification value from the plurality of possible classification values being smaller than the actual classification value, and wherein the second classification value is the smallest classification value from the plurality of possible classification values being larger than the actual classification value.

In other words, the plurality of possible classification values can be arranged in an ascending order, the first classification value and the second classification value are the two neighbors of the actual classification value, the first classification value being smaller than the actual classification value, and the second classification value being larger than the actual classification value.

The inventors recognized that by using the described choice of the first and the second classification value the classification explanation can comprise information about why the actual classification value and not one of the other nearest classification values in a stepwise sequence have been chosen by the classification function.

According to a further embodiment of the invention, the anatomical structure in the acquired medical image is a lesion. Furthermore, the actual classification value, the first classification value and/or the second classification value correspond to a benignancy and/or a malignancy of the lesion. In particular, a classification value corresponding to the benignancy and/or the malignancy of the lesion indicates the benignancy and/or malignancy of the lesion. In particular, the indication can be given in terms of a standardized classification scheme, e.g. the TNM Classification of Malignant Tumors, BI-RADS (acronym for "Breast Imaging Reporting and Data System"), Ann Arbor staging, modified Ann Arbor staging, CIN staging (acronym for "cervical intraepithelial neoplasia").

In general, a lesion is a damage or abnormal change in the tissue of an organism, usually caused by disease or trauma. Lesions can occur anywhere in the body. Generally, lesions may be classified by their patterns, their sizes, their locations, or their causes.

In particular, a lesion can be a neoplasm. In particular, a neoplasm is a type of abnormal and excessive growth of tissue. This abnormal growth usually forms a mass, when it may be called a tumor. In particular, a neoplasm can be classified as being an benign neoplasm, an in situ neoplasm, a malignant neoplasm, and/or a neoplasms of uncertain or unknown behavior. Malignant neoplasms can also be denoted as "cancer".

According to a potential further embodiment of the invention, if the actual classification value corresponds to a benign lesion, the first classification value and/or the second classification value can correspond to a malignant lesion, alternatively, if the actual classification value corresponds to a malignant lesion, the first classification value and/or the second classification value can correspond to a benign lesion.

According to a potential further embodiment of the invention, the actual classification value, the first classification value and/or the second classification value correspond to a degree of benignancy and/or malignancy of the lesion, wherein the first classification value corresponds to a degree being one level below the actual classification value, and/or wherein the second classification value corresponds to a degree being one level above the actual classification value.

According to a potential further embodiment of the invention, the actual classification value, the first classification value and/or the second classification value correspond to a degree of benignancy and/or malignancy of the lesion, wherein the first classification value corresponds to a degree being one level above the actual classification value, and/or wherein the second classification value corresponds to a degree being one level below the actual classification value.

The inventors recognized that by using the method with respect to lesions a classification explanation with respect to the benignancy and/or malignancy of a certain lesion can be provided by visualizing the difference of the actual anatomical structure and a hypothetical structure with differing benignancy and/or malignancy.

According to a further embodiment of the invention the first generative function and/or the second generative function are based on a generative adversarial algorithm, in particular, based on a cycle-consistent generative adversarial algorithm. In particular, the first generative function and the second generative function are based on a cycle-consistent generative adversarial algorithm.

A generative adversarial algorithm (an acronym is GA algorithm) comprises a generative function and a discriminative function. Here the generative function creates synthetic data and the discriminative function distinguishes between synthetic and real data. What is achieved in particular by a training of the generative function and/or of the discriminative function is that on the one hand the generative function creates synthetic data, which is incorrectly classified by the discriminative function as real, on the other hand the discriminative function can distinguish as well as possible between real data and synthetic data. In games theory a generative adversarial algorithm can also be interpreted as a zero-sum game. The training of the generative function and/or of the discriminative function is based, in particular, on the minimization of a cost function in each case.

The first generative function can be based on a generative adversarial algorithm by the first generative function being identical with the generative function of the generative adversarial algorithm. The first generative function and the second generative function can be based on the same generative adversarial algorithm or on different generative adversarial algorithms.

A cycle-consistent generative adversarial algorithm (an acronym is "CC-GA algorithm") is based on a first GA algorithm and a second GA algorithm. The generative function of the first GA algorithm transforms input data of a first domain into output data of a second domain, wherein the generative function of the second GA algorithm transforms input data of the second domain into output data of the first domain. What is achieved in particular by a training of the generative functions and/or of the discriminative functions is that a concatenation of the generative function of the first GA algorithm and the generative function of the second GA algorithm are near the identity function, and vice versa. The training of the generative functions and/or of the discriminative functions is based, in particular, on the minimization of a cost function comprising a cycle-consistency term in each case. In particular, a first domain and a second domain can be images comprising anatomical structures with a certain classification value.

The inventors recognized that GA algorithms are suitable for generating realistic synthetic images. In particular, by using GA algorithms the synthetic images can contain realistic anatomical structures relating to differing classification values. Furthermore, the inventors recognized that by using CC-GA algorithms the anatomical structures relating to differing classification values can have a shape that is very similar to the original anatomical structure in the acquired medical image, and differing only in the parts necessary for simulating a different classification value.

According to a further embodiment of the invention, the first generative function is the generative part of a first generative adversarial algorithm, and/or wherein the second generative function is the generative part of a second generative adversarial algorithm.

According to a further embodiment of the invention, the first generative function is the generative part of a first generative adversarial algorithm, wherein the second generative function is the generative part of a second generative adversarial algorithm, and wherein the first generative adversarial algorithm and the second generative adversarial algorithm form a cycle-consistent generative adversarial algorithm.

According to a further embodiment of the invention, the first generative function and/or the second generative function are artificial neural networks. In particular, the respective general adversarial algorithms are general adversarial networks.

In particular, a GA algorithm is denoted as GA network (an acronym is "GAN") if the generative function and the discriminative function are given by a network, in particular by an artificial neural network, then the GA algorithm is also referred to as GA networks (also "GAN", which is an acronym for "generative adversarial networks". These are known in particular from the publication by Ian J. Goodfellow, "Generative Adversarial Networks", arxiv 1406.2661 (2014), the entire contents of which are hereby incorporated herein by reference. The cost function can be minimized in particular by back propagation.

According to a further embodiment of the invention, the classification function is based on the generative adversarial algorithm, in particular, based on the cycle-consistent generative adversarial algorithm. The inventors recognized that by connecting the classification function and the generative adversarial algorithm the decision explanation can be tied closely to the classification function.

According to a further embodiment of the invention, the classification function is based on the discriminative part of the generative adversarial algorithm or the cycle-consistent generative adversarial algorithm. In particular, the discriminative part of the generative adversarial algorithm can give two results when being applied to an input image, namely a first result corresponding to whether the input image is a real/acquired medical image or a synthetic image, and a second result corresponding to the classification value of an anatomical structure within the input image.

According to a further embodiment of the invention, the classification function is an artificial neural network, in particular, wherein the classification function is a deep artificial neural network, in particular, wherein the classification function is a convolutional deep neural network. The inventors recognized that classification functions based on neural networks, in particular based on deep neural networks, in particular based on deep convolutional neural networks are particularly suitable for classifying (medical) images.

According to a second embodiment, the invention relates to an explanation system for providing a classification explanation, comprising an input interface, an output interface and a computation unit, wherein the input interface is configured for receiving an acquired medical image corresponding to an examination volume, wherein the input interface and/or the computation unit are configured for receiving or determining an actual classification value, in particular by applying a classification function to the acquired medical image to generate the actual classification value, wherein the actual classification value classifies an anatomical structure within the acquired medical image, wherein the input interface or the computation unit are configured for receiving or determining a first classification value being different from the actual classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

According to a further embodiment, the invention relates to an explanation system for providing a classification explanation, comprising an input interface, an output interface and a computation unit, wherein the input interface is configured for receiving an acquired medical image corresponding to an examination volume, wherein the computation unit is configured for applying a classification function to the acquired medical image, thereby generating an actual classification value classifying an anatomical structure within the acquired medical image, wherein the input interface and/or the computation unit are configured for receiving or determining a first classification value being different from the actual classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

According to a further embodiment, the invention relates to an explanation system for providing a classification explanation, comprising an input interface, an output interface and a computation unit, wherein the input interface is configured for receiving an acquired medical image corresponding to an examination volume, the acquired medical image comprises an anatomical structure, in particular wherein the anatomical structure is classified by an actual classification value, wherein the input interface is configured for receiving a first classification value, wherein the first classification value is a potential classification value of the anatomical structure within the acquired medical image, wherein the computation unit is configured for applying a first generative function to the acquired medical image, thereby generating a first synthetic image, wherein the first generative function is based on the first classification value, wherein the first generative function is configured to modify the anatomical structure to exhibit the first classification value, wherein the output interface is configured for providing a visualization based on the acquired medical image and the first synthetic image.

In particular, the explanation systems are configured to execute the previously described method for providing a classification explanation. The explanation systems are configured to execute the previously described method for providing a classification explanation and its embodiments by their interfaces and their computation units being configured to execute the respective method steps.

The explanation systems can be realized as a data processing system or as a part of a data processing system. Such a data processing system can, for example, comprise a cloud-computing system, a computer network, a computer, a tablet computer, a smartphone, a microprocessor or the like. The explanation system can comprise hardware and/or software. The hardware can be, for example, a processor system, a memory system and combinations thereof. The hardware can be configurable by the software and/or be operable by the software.

Whenever modules like interfaces, computation units or memory units are mentioned herein, it shall be understood that this may refer to modules realized as hardware and/or as software. The modules are mentioned and described as a way of facilitating understanding, and it will be clear that all functions of all modules may be realized by one and the same body of computer program instructions (or: computer code). Moreover, the functions of any or all modules may overlap, and some modules may be integrated into other modules, without departing from the present disclosure. Furthermore, every module could also be a logical combination of several (identical or different) physical sub-modules that could also be distributed to various spatial locations.

According to a third embodiment, the invention relates to a medical imaging system comprising an explanation system according to an embodiment of the invention. In particular, a medical imaging system can be an X-ray imaging system, a computed tomography imaging system, a magnetic resonance imaging system, a PET imaging system, SPECT imaging system, and/or an ultrasound imaging system. Furthermore, a medical imaging system can be a microscopy imaging system, histopathology imaging system and/or a time-continuous biosignal analysis imaging system.

According to a fourth embodiment, the invention relates to a computer-implemented method for providing a first generative function, comprising:

receiving a first training image, the first training image comprising a first training anatomical structure, the first training anatomical structure being classified by a first training classification value, receiving or determining a second training classification value being different from the first training classification value, wherein the second training classification value is a potential classification value of the first anatomical structure within the first training medical image, applying a first generative function to the first training image, thereby generating a modified first training image, wherein the first generative function is based on the second training classification value, receiving a first input image, the first input image comprising a first input anatomical structure, the first input anatomical structure being classified by the second training classification value, applying a first discriminative function to the first input image, thereby generating a first discriminator value, applying the first discriminative function to the modified first training image, thereby generating a second discriminator value, adapting a parameter of the first generative function and/or of the first discriminative function based on an generative-adversarial loss function,
wherein the generative-adversarial loss function is based on the first discriminator value and the second discriminator value,
providing the first generative function and/or the first discriminative function.

In particular, a training image can be an acquired medical image. The training image can comprise all advantageous features and possible embodiments of an acquired medical image. In particular, an input image can be an acquired medical image. The input image can comprise all advantageous features and possible embodiments of an acquired medical image. In particular, a modified training image can be a first synthetic image. The modified training image can comprise all advantageous features and possible embodiments of a first synthetic image.

In particular, the first training classification value can be an actual classification value of the anatomical structure of the anatomical structure within the first training image. In particular, the first training classification value can comprise all advantageous features and possible embodiments of an actual classification value. In particular, the first training classification value can be determined by applying a classification function to the first training image. In particular, the second training classification value is the classification value according to which the modified first training image should be classified. In particular, the second training classification value can be determined by applying the classification function to the first input image.

In particular, a discriminative function is a trained function. In particular, a discriminative function is trained for distinguishing real or acquired input data from synthetic input data. In particular, the first generative function and the first discriminative function can be based on a generative adversarial algorithm by the first generative function being identical with the generative function of the generative adversarial network, and by the first discriminative function being identical with the discriminative function of the generative adversarial algorithm.

A discriminator value is the result of applying a discriminative function to imaging data. In particular, the discriminator value comprises a probability value, wherein ideally the probability value is 1 for real imaging data being used as input for the discriminative function, and 0 for synthetic data being used as input for the discriminative function.

In particular, adapting a parameter of a trained function can be based on minimizing a loss function. In particular, the loss function can comprise an adversarial loss function. In particular, minimizing the loss function can be based on a stepwise (gradient) descent. In particular, if the trained function is an artificial neural network, a parameter can correspond to at least one edge weight of the respective network, and minimizing the parameter can be based on the backpropagation algorithm.

In particular, an adversarial loss function comprises a term that incurs loss for the discriminative function if the discriminative function wrongly determines a synthetic input image to be a real one and/or a term that incurs loss for the discriminative function if the discriminative function wrongly determines a real input image as a synthetic one. In particular, an adversarial loss function comprises a term that incurs loss for the generative function The inventors recognized that based on the described method a first generative function can be provided that allows for explaining a classification decision.

In this training method, the first training image and the first input image are acquired medical images (comprising a real anatomical structure), and the first modified training image is a synthetic image (not comprising a real anatomical structure, but a synthetic anatomical structure). The anatomical structure within the first training image corresponds to a first classification value, and the anatomical structure within the second input image corresponds to a second classification value.

The first discriminative value is the result of the first discriminative function applied to the first input image. Using an ideal first discriminative function, the first discriminative value would be 1, corresponding to the result of the first discriminative function being that the first input image is a real image. The second discriminative value is the result of the first discriminative function applied to the modified first training image. Using an ideal first discriminative function, the first discriminative value would be 0, corresponding to the result of the first discriminative function being that the modified first training image is a real training image.

By using an adversarial loss function, parameters of the first discriminative function are adapted such that the output of the first discriminative function is driven towards the ideal value. At the same time, the parameters of the first generative function are adapted such that the output of the first generative function makes the first discriminative function to wrongly classify it as a real image. This implies that the first generative function is trained by the proposed method to imitate a real medical image comprising an anatomical structure with the second classification value.

According to a further embodiment, the method for providing a first generative function comprises:
applying a second generative function to the modified first training image, thereby generating a comparison first training image,
wherein the second generative function is based on the first training classification value,
adapting a parameter of the first generative function and/or of the second generative function based on an cycle-consistency loss function,
wherein the cycle-consistency loss function is based on a difference of the comparison first training image and the first training image.

In particular, cycle-consistency loss function comprises a term that incurs loss for the first generative function and/or the second generative function for deviations between the comparison first training image and the first training image.

The inventors recognized that by using a cycle-consistency loss the first generative function and/or the second generative function can be trained to provide synthetic images that closely resemble the input of the generative function, however, simulate a different classification value. Such generative functions can be used well for decision explaining in the field of images, in particular, medical images.

According to a further embodiment, the method for providing a first generative function comprises:
receiving a second training image, the second training image comprising a second anatomical structure, the second anatomical structured being classified by the second training classification value,
applying a second generative function to the second training image, thereby generating a modified second training image, wherein the second generative function is based on the first training classification value, receiving a second input image, the second input image comprising a second input anatomical structure, the second input anatomical structure being classified by the first training classification value, applying a second discriminative function to the second input image, thereby generating a third discriminator value, applying the second discriminative function to the modified second training image, thereby generating a fourth discriminator value, adapting a parameter of the second generative function and/or of the second discriminative function based on an generative-adversarial loss function, wherein the generative-adversarial loss function is based on the third discriminator value and the fourth discriminator value.

The inventors recognized that by using a generative adversarial training both generative functions (or, equivalently, the same generative function based on different classification values) can be trained to imitate input images.

According to a potential further embodiment, the method for providing a first generative function comprises:

applying the first generative function to the modified second training image, thereby generating a comparison second training image, wherein the first generative function is based on the second training classification value, adapting a parameter of the first generative function and/or of the second generative function based on a cycle-consistency loss function, wherein the cycle-consistency loss function is based on a difference of the comparison second training image the second training image.

The inventors recognized that by using a cycle-consistency loss the first generative function and/or the second generative function can be trained to provide synthetic images that closely resemble the input of the generative function, however, simulate a different classification value. By using the cycle-consistency loss for both possible orders of the first generative function and the second generative function, the consistency of the generative functions is even better. Such generative functions can be used well for decision explaining in the field of images, in particular, medical images.

According to a further embodiment of the invention, the parameter of the first generative function and/or of the second generative function are furthermore adapted based on a classification loss function, wherein the classification loss function is based on a difference of the second classification value and the result of using a classification function on the modified first medical image and/or wherein the classification loss function is based on a difference of the first classification value and the result of using the classification function on the modified second medical image.

The inventors recognized that by using the classification loss in the training, or by using the classification function in the training, the outputs of the generative functions can be adapted better to the performance of the classification function. In particular, the generative functions are trained such that their output actually would be classified by the classification function as being the classification value they are based on. In particular, by this feature the generative functions are trained to operate in the space of classifications given of the classification function rather than in the space of the classification values externally given.

According to a further embodiment, the invention relates to a training system for providing a first generative function, comprising an input interface, an output interface and a computation unit, wherein the input interface is configured for receiving a first training image, the first training image comprising a first training anatomical structure, the first training anatomical structure being classified by a first training classification value, wherein the input interface and/or the computation unit are configured for receiving or determining a second training classification value being different from the first training classification value, wherein the second training classification value is a potential classification value of the first anatomical structure within the first training medical image, wherein the computation unit is configured for applying a first generative function to the first training image, thereby generating a modified first training image, wherein the first generative function is based on the second training classification value, wherein the input interface is configured for receiving a first input image, the first input image comprising a first input anatomical structure, the first input anatomical structure being classified by the second training classification value, wherein the computation unit is configured for applying a first discriminative function to the first input image, thereby generating a first discriminator value, wherein the computation unit is configured for applying the first discriminative function to the modified first training image, thereby generating a second discriminator value, wherein the computation unit is configured for adapting a parameter of the first generative function and/or of the first discriminative function based on an generative-adversarial loss function, wherein the generative-adversarial loss function is based on the first discriminator value and the second discriminator value, wherein the output interface is configured for providing TPROV the first generative function and/or the first discriminative function.

In particular, the training system is configured to execute the previously described method for providing a first generative function. The training system is configured to execute the previously described method for providing a classification explanation and its embodiments by its interfaces and its computation unit being configured to execute the respective method steps.

The training system can be realized as a data processing system or as a part of a data processing system. Such a data processing system can, for example, comprise a cloud-computing system, a computer network, a computer, a tablet computer, a smartphone, a microprocessor or the like. The explanation system can comprise hardware and/or software. The hardware can be, for example, a processor system, a memory system and combinations thereof. The hardware can be configurable by the software and/or be operable by the software.

According to a further embodiment of the invention, in the method for providing a classification explanation according to the invention an its embodiments the first generative function and/or the second generative function have been provided by a method for providing a first generative function according to the invention and its embodiments.

According to a further embodiment, the invention relates to a system comprising an explanation system according to an embodiment of the invention and its embodiments or a medical imaging system according to the invention and its embodiments, and a training system according to an embodiment of the invention and its embodiments, wherein the first generative function provided by the training system is used within the explanation system.

According to a further embodiment, the invention relates to a computer program or computer program product comprising instructions which, when the program is executed by an explanation system, cause the explanation system to carry out the method for providing a classification explanation according to the invention and its embodiments.

According to a further embodiment, the invention relates to a computer-readable medium comprising instructions which, when executed by an explanation system, cause the explanation system to carry out the method for providing a classification explanation according to the invention and its embodiments.

According to a further embodiment, the invention relates to a computer program or computer program product comprising instructions which, when the program is executed by a training system, cause the training system to carry out the method for providing a first generative function according to the invention and its embodiments.

According to a further embodiment, the invention relates to a computer-readable medium comprising instructions which, when executed by a training system, cause the training system to carry out the method for providing a first generative function according to the invention and its embodiments.

The realization of the invention by a computer program product and/or a computer-readable medium has the advantage that already existing generating systems can be easily adopted by software updates in order to work as proposed by embodiments of the invention.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

FIG. 1 displays a first data flow diagram according to embodiments of the invention, FIG. 2 displays a second data flow diagram according to embodiments of the invention. In contrast to the first data flow diagram, a second generative function GF.2 is present in the second data flow diagram. In the following, both FIG. 1 and FIG. 2 are described in the context of FIG. 2 (with a second generative function GF.2 being present), however, the following description can also be understood as related to FIG. 1.

The seed element of the first data flow diagram and the second data flow diagram is the acquired medical image IMG.A. By applying APPL-CV a classification function CF to the acquired medical image IMG.A, an actual classification value CV.A is determined or generated. Denoting with x the acquired medical mage IMG.A, and by cA the actual classification value CV.A, the latter one can be determined as cA=CF(x).

Within the data flow diagrams, there are also a first classification value CV.1 and a second classification value CV.2. These additional classification values CV.1, CV.2 can be received as user input, or they can be determined based on known quantities (e.g. based on the actual classification value CV.A, as indicated by the dashed line).

Furthermore, a first synthetic image IMG.1 and a second synthetic image IMG.2 are determined by using a first generative function GF.1 and a second generative function GF.2. The first generative function GF.1 uses as input the acquired medical image IMG.A and is based on the first classification value CV.1, the second generative function GF.2 uses as input the acquired medical image IMG.A and is based on the second classification value CV.2.

A generative function GF.1, GF.2 can be based on a classification value CV.1, CV.2 by using it as an additional input parameter. Denoting GF1 and GF2 as generative function GF.1, GF.2, $y_1$ and $y_2$ as synthetic images IMG.1, IMG.2, as well as $c_1$ and $c_2$ as classification values CV.1, CV.2, this would result in $y_1 = GF_1(x, c_1)$ and $y_2 = GF_2(x, c_2)$. In this alternative, the generative functions GF.1, GF.2 map images and classification values to images, as $GF_{1/2}: R^n \times C \rightarrow R^n$, where R denotes the real numbers, n denotes the dimensionality of the images IMG.A, IMG.1, IMG.2 and C denotes the set of possible classification values CV.1, CV.2, CV.A. In particular, here the generative functions GF.1, GF.2 can be identical.

Alternatively, a generative function GF.1, GF.2 can be based on a classification value CV.1, CV.2 by the generative function GF.1, GF.2 being chosen from a plurality of generative functions based on the classification value CV.1, CV.2. In this alternative, the generative functions GF.1, GF.2 map images to images, as $GF_{1/2}: R^n \to R$. In particular, in this alternative the possible first and second classification values CV.1, CV.2 are restricted based on the available generative functions. For example, if classification values CV.1, CV.2, CV.A are comparable and discrete, and if the plurality of available generative functions comprises a first available generative function, denoted as $G_+$, which transforms anatomical structures in medical images one level higher in terms of classification values CV.1, CV.2, CV.A, and a second available generative function, denoted as $G_-$, which transforms anatomical structures in medical images one level lower in terms of classification values CV.1, CV.2, CV.A, then $G_{1/2}=G_+$ if $c_{1/2}=c_a+1$ and $G_{1/2}=G_-$ if $c_{1/2}=c_a-1$ (wherein the +1 and −1 are not necessarily arithmetic operations, but represent going to the next or previous level of classification values CV.1, CV.2, CV.A).

Optionally, within the data flow diagrams there is a modified medical image IMG.M. The modified medical image IMG.M can be determined based on the acquired medical image IMG.A and the first synthetic image IMG.1; or, the modified medical image IMG.M can be determined based on the acquired medical image IMG.A, the first synthetic image IMG.1 and the second synthetic image IMG.2.

FIG. 3, FIG. 4 and FIG. 5 show data flow diagrams related to embodiments of the invention for providing a first generative function GF.1. It has to be understood that objects occurring twice in the same flow diagram (e.g. the first generative function GF.1) do refer to the same object and are drawn twice only for a better visibility of the data flow. Furthermore, dotted lines do not represent a direct data flow, but indicted which loss functions are used for adapting parameters of which trained functions GF.1, GF.2, DF.1, DF.2.

The seed elements of the data flow diagram displayed in FIG. 3 and FIG. 4 are the first training image IMG.T1 and the first input image IMG.S1. The first training image IMG.T1 comprises a first anatomical structure, and the first input image IMG.S1 comprises a first input anatomical structure. The first anatomical structure and the first input anatomical structure have the same type (e.g., both are lesions, e.g. lung nodules), but the first anatomical structure is classified by a first training classification value CV.T1 and the first input anatomical structure is classified by a second training classification value CV.T2, the first training classification value CV.T1 and the second training classification value CV.T2 being different.

In the embodiment displayed in FIG. 5, additional seed elements are a second training image IMG.T2 and a second input image IMG.S2. The second training image IMG.T2 comprises a second anatomical structure, and the second input image IMG.S2 comprises a second input anatomical structure. The second anatomical structure and the second input anatomical structure have the same type as the first anatomical structure and the first input anatomical structure (e.g., both are lesions, e.g. lung nodules), wherein the second anatomical structure is classified by a second training classification value CV.T2 and the second input anatomical structure is classified by a first training classification value CV.T1, the first training classification value CV.T1 and the second training classification value CV.T2 being different.

Based on the training image IMG.T1, IMG.T2, by applying the first generative function GF.1 and the second generative function GF.2 a modified training image IMG.T1', IMG.T2' can be calculated. Denoting with $t_{1/2}$ the first training image IMG.T1 and the second training image IMG.T2, with $c_{1/2}$ the first training classification value CV.T1 and the second training classification value CV.T2, and with $GF_{1/2}$ the first generative function GF.1 and the second generative function GF.2, the modified training image IMG.T1', IMG.T2' can be calculated as $t_1'=GF_1(t_1, c_2)$ and $t_2'=GF_2(t_2, c_1)$. The training classification value CV.T1, CV.T2 can be given as input parameter, or be obtained by using the classification function CF on the first input image IMG.S1 (denoted by $s_1$) as $c_2=CF(s_1)$ and/or on the second input image IMG.S2 (denoted by $s_2$) as $c_1=CF(s_2)$. Alternatively, here also the training image IMG.T1, IMG.T2 can be used.

Here the generative function GF.1, GF.2 is based on a classification value CV.T1, CV.T2 by using it as an additional input parameter. In particular, the first generative function GF.1 and the second generative function GF.2 can be equivalent and only differ in the value of the additional input parameter used. Alternatively, the generative function GF.1, GF.2 can be chosen from a plurality of possible generative functions as described with respect to FIG. 1 and FIG. 2.

In the embodiments displayed in FIG. 3 to FIG. 5, furthermore a first discriminative function DF.1 (denoted as DF1) and a second discriminative function DF.2 (denoted as DF2) are used. The discriminative functions DF.1, DF.2 take as inputs an image, and output a discriminative value. In particular, the discriminative value can be a probability value between 0 and 1, indicating whether according to the discriminative function GF.1, GF.1 the input image IMG.S1, IMG.S2 is a real/acquired image (as the first input image IMG.S1 or the second input image IMG.S2) or a synthetic/generated image (as the modified first training image IMG.T1' or the modified second training image IMG.T2').

In these embodiments, similar to the generative function GF.1, GF.2, the discriminative function DF.1, DF.2 is based on a classification value CV.T1, CV.T2, either by using the classification value CV.T1, CV.T2 as additional input parameter, or by choosing from a plurality of discriminative functions based on the classification value CV.T1, CV.T2. In the former case, the first discriminative function DF.1 and the second discriminative function DF.2 can be equivalent and only differ in the value of the additional input parameter used. Denoting DF1 and DF2 as discriminative function DF.1, DF.2, in the first alternative the discriminative functions DF.1, DF.2 map images and classification values CV.T1, CV.T2 to a real number (being a probability value), as $DF_{1/2}: R_n \times C \rightarrow [0,1]$, where R denotes the real numbers, n denotes the dimensionality of input images IMG.S1, IMG.S2 and C denotes the set of possible classification values CV.T1, CV.T2. In the second alternatives the discriminative functions DF.1, DF.2 map images to a real number (being a probability value), as $GF_{1/2}: R^n \rightarrow [0,1]$.

The discriminative functions DF.1, DF.2 herein are used to determine discriminative values that are used in an adversarial loss L.ADV. A first discriminative value can be calculated as $d_1 = DF_1(s_1, c_2)$, and a second discriminative value can be calculated as $d_2 = DF_1(t_1', c_2) = DF_1(GF_1(t_1, c_2), c_2)$. Furthermore, in the embodiment displayed in FIG. 5, a third discriminative value can be calculated as $d_3 = DF_2(s_2, c_1)$, and a fourth discriminative value can be calculated as $d_4 = DF_2(t_2', c_1) = DF_2(GF_2(t_2, c_1), c_1)$.

In the embodiments displayed in FIG. 3 to FIG. 5, the adversarial loss L.ADV has a component $L^{(DF1)}_{adv} \sim -\log DF_1(s_1, c_2) - \log[1 - DF_1(GF_1(t_1, c_2), c_2)]$ for the first discriminative function DF.1, and $L^{(GF1)}_{adv} \sim -\log[1 - DF_1(GF_1(t_1, c_2), c_2)]$ for the first generative function GF.1. In the embodiments displayed in FIG. 5, the adversarial loss L.ADV has a component $L^{(DF2)}_{adv} \sim -\log DF_2(s_2, c_1) - \log[1 - DF_2(GF_2(t_2, c_1), c_1)]$ for the second discriminative function DF.2, and $L^{(GF2)}_{adv} \sim -\log[1 - DF_2(GF_2(t_2, c_1), c_1)]$ for the second generative function GF.2.

The first and the second discriminative values can be used to adapt the parameters of the first generative function GF.1 and the first discriminative function GF.2, by minimizing the loss function comprising the adversarial loss L.ADV. The third and the fourth discriminative values can be used to adapt the parameters of the second generative function GF.2 and the second discriminative function DF.2, by minimizing the loss function comprising the adversarial loss L.ADV.

In the embodiments displayed in FIG. 4 and FIG. 5, the second generative function GF.2 is furthermore applied to the modified first training image IMG.T1' to determine a comparison first training image IMG.T1" denoted by $t_1$". In particular, the comparison first training image IMG.T1" is determined as $t_1" = GF_2(t_1', c_1) = GF_2(GF_1(t_1, c_2), c_1)$. In the embodiment displayed in FIG. 5, the first generative function GF.1 is furthermore applied to the modified second training image IMG.T2' to determine a comparison second training image IMG.T2" denoted by $t_2$". In particular, the comparison second training image IMG.T2" is determined as $t_2" = GF_1(t_2', c_2) = GF_1(GF_2(t_2, c_1), c_2)$.

The comparison training images IMG.T1", IMG.T2" can be used in a cycle-consistency loss L.CYC, which has a component $L_{cc} \sim \|t_1 - t_1"\|_m = \|t_1 - GF_2(GF_1(t_1, c_2), c_1)\|_m$ and/or a component $L_{cc} \sim \|t_2 - t_2"\|_m = \|t_2 - GF_1(GF_2(t_2, c_1), c_2)\|_m$, wherein $\|x\|_m$ denotes the m-norm (normally, m=1 or m=2 is used). These loss functions can be minimized by adapting the parameters of the first generative function GF.1 and the second generative function GF.2.

FIG. 6 displays a first embodiment of the method for providing a classification explanation according to the invention.

The first embodiment comprises the step of receiving RECIMG.A an acquired medical image IMG.A corresponding to an examination volume. This step is executed by an interface ESYS.IF of an explanation system ESYS. In this embodiment, the acquired medical image IMG.A is based on a computed tomography imaging procedure. In particular, the acquired medical image IMG.A is a two-dimensional cut through a lesion within the computed tomography dataset. Alternatively, the acquired medical image IMG.A could also be a three-dimensional medical image comprising the lesion. In particular, the acquired medical image IMG.A is contained within a DICOM image dataset. The DICOM image dataset can comprise additional information, e.g. a name of the patient, the age of the patient, and/or information with respect to the underlying imaging examination, e.g. the imaging protocol used.

A further step of the displayed embodiment is receiving or determining REC-DET-CV.A an actual classification value CV.A, wherein the actual classification value CV.A classifies an anatomical structure within the acquired medical image IMG.A. In the displayed embodiment, the anatomical structure within the acquired medical image IMG.A is the lesion, and the actual classification value CV.A corresponds to the benignancy and/or the malignancy of the lesion within the acquired medical image IMG.A.

In this embodiment, the actual classification value CV.A is determined by applying a classification function CF to the acquired medical image IMG.A. Here, the respective step is executed by a computation unit ESYS.CU of the explanation system ESYS. This implies that the same system evaluating the acquired medical image IMG.A (by applying the classification function CF to the acquired medical image IMG.A) also provides an explanation with respect to the actual classification value CV.A. Alternatively, the actual classification value CV.A can be determined outside and received within the method step, in particular, by the interface ESYS.IF of the explanation system ESYS. This implies that there is a different system providing the explanation with respect to the actual classification value CV.A than actually determining the actual classification value CV.A.

In this embodiment, the actual classification value CV.A is a real number between 0 and 1, wherein the value 0 corresponds to a benign nodule, and the value 1 corresponds to a malignant nodule. Values between 0 and 1 correspond to different levels of certainty of the classification function CV (the values 0 and 1 corresponding to a maximal certainty, and the value 0.5 corresponding to a maximal uncertainty). Alternatively, the actual classification value CV.A can correspond to a discrete classification of the anatomical structure (e.g. a BI-RADS score for breast imaging).

It is also possible to use different anatomical structures and different classification values. An example for a classification value that could be used is a survival estimation. The survival estimation can be given in an amount of time (e.g. a number of month or years) dependent on the severity of a certain anatomical structure, like a certain tumor. In this case, it would also possible to use discrete classes of survival estimations (e.g., "less than 1 month", "two or three months", "four to five months", "six to 12 months", "more than a year"). A further possible classification value could be used in brain hemorrhage detection, e.g. a probability value for the presence of a brain hemorrhage. A further possible classification task could relate to medical image segmentation, a classification value could here correspond to a segmentation mask (i.e., the set of voxels related to a certain anatomical structure).

A further step of this embodiment is receiving or determining REC-DET-CV.1 a first classification value CV.1 being different from the actual classification value CV.A, wherein the first classification value CV.1 is a potential classification value of the anatomical structure within the acquired medical image IMG.A. In particular, the potential classification values are given by the potential outputs of the classification function.

In this embodiment, the first classification value CV.1 is then also a real number between 0 and 1, as the actual classification value CV.A. In the alternative, if the actual classification value CV.A can be an element of a discrete set of potential classification value (e.g. a BI-RADS score), also the first classification value CV.1 could be selected or determined out of this discrete set.

In this embodiment, the first classification value CV.1 is determined based on the actual classification value CV.A by the computation unit ESYS.CU of the explanation system ESYS. In particular, the first classification value CV.1 can be selected as being 0 (to visualize an explanation why the classification did not result in a sure benign classification) or as being 1 (to visualize an explanation why the classification did not result in a sure malignant classification), in particular depending on whether the actual classification value CV.A is smaller or larger than 0.5. Alternatively, the first classification value CV.1 can be received with the interface ESYS.IF of the explanation system ESYS, for example, as a user input. The latter alternative is in particular useful to have an interactive explanation for the user, in particular in the area of teaching radiologists.

If the set of potential classification values is discrete and comparable, the first classification value CV.1 can be the next potential classification value being larger than the actual classification value CV.A, or the first classification value CV.1 can be the next potential classification value being smaller than the actual classification value CV.A. This setup enables to visualize why a certain actual classification value CV.A was assigned to the anatomical structure, and not a neighboring classification value.

A further step of the displayed embodiment is applying APPL-GF.1 a first generative function GF.1 to the acquired medical image IMG.A, thereby generating a first synthetic image IMG.S1. Here the first generative function GF.1 is based on the first classification value CV.1, and the first generative function GF.1 is configured to modify the anatomical structure to exhibit the first classification value CV.1.

In particular, the first generative function GF.1 is configured or trained to change the shape and/or the texture of the anatomical structure within the acquired medical image IMG.A, not changing the surrounding of the anatomical structure in the acquired medical image IMG.A, and so creating a first synthetic image IMG.S1 that differs from the acquired medical image IMG.A only insofar that the anatomical structure within the synthetic image IMG.S1 would be classified by the first classification value CV.1. In particular, the first synthetic image IMG.S1 does have the same dimensionality as the acquired medical image IMG.A, and the first synthetic image IMG.S1 does have the same size as the acquired medical image IMG.A measured in number of voxels with respect to every dimension.

Within this embodiment, to achieve this target, the first generative function GF.1 is based on a cycle-consistent generative adversarial algorithm. In particular, the generative function GF.1 corresponds to a generative part of the cycle-consistent generative adversarial algorithm. In particular, the first generative function GF.1 is an artificial neural network.

In this embodiment, the first generative function GF.1 is selected from a generative function GF(0) configured to create synthetic images comprising an anatomical structure being classified with a classification value of 0, and a generative function GF(1) configured to create synthetic images comprising an anatomical structure being classified with a classification value of 1. In the alternative, if the actual classification value CV.A and the first classification value CV.1 are from a discrete and orderable set, the first generative function GF.1 is selected from a generative function GF(+) configured to create synthetic images comprising an anatomical structure being classified with a classification value being one step larger than the classification value of the anatomical structure in the input image, and a generative function GF(−) configured to create synthetic images comprising an anatomical structure being classified with a classification value being one step smaller than the classification value of the anatomical structure in the input image.

Alternatively, the first classification value CV.1 can be used as an additional parameter for the first generative function GF.1.

The last step of the displayed embodiment is providing PROV-VIS a visualization based on the acquired medical image IMG.A and the first synthetic image IMG.S1. In this embodiment, the acquired medical image IMG.A and the first synthetic image IMG.S1 are displayed side-by-side and spatially aligned. Alternatively, the first synthetic image IMG.S1 can be displayed as an overlay for the acquired medical image IMG.A that could be inserted and removed by way of an interaction of a user. Alternatively, markers can be displayed in the acquired medica image IMG.S1 based on the first synthetic image IMG.S2.

FIG. 7 displays a second embodiment of the method for providing a classification explanation according to the invention.

The steps of receiving REC-IMG.A an acquired medical image IMG.A, of receiving or determining REC-DET-CV.A an actual classification value CV.A, of receiving or determining REC-DETCV.1 the first classification value CV.1 being different from the actual classification value CV.A and of applying APPL-GF.1 the first generative function GF.1 to the acquired medical image IMG.A are identical to the respective steps of the first embodiment displayed in FIG. 6. In particular, they can exhibit all advantageous features and implement the embodiments described therein.

The second embodiment furthermore comprises the step of determining DET-IMG.M a modified medical image IMG.M based on the acquired medical image IMG.A and the first synthetic image IMG.S1.

In this embodiment, each voxel of the modified medical image IMG.M comprises a first intensity value and a second intensity value. The first intensity value corresponds to the intensity value of the respective voxel of the acquired medical image IMG.A. The second intensity value corresponds to a voxel-wise difference of the modified medical image IMG.M and the first synthetic image IMG.S1. Using the notations of FIG. 1, denoting by $x_m$ the modified medical image IMG.M, the modified medical image IMG.M is given voxel-wise by $x_m=(x, s_1-x)$ or $x_m=(x, |s_1-x|)$.

Furthermore, providing PROV-VIS the visualization comprises providing the modified medical image IMG.M. In this embodiment, the modified medica image IMG.M comprises two color channels, the first color channel relating to the first intensities and being a greyscale channel, and the second color channel relating to a scale from transparent to red.

FIG. 8 displays a third embodiment of the method for providing a classification explanation according to the invention.

The steps of receiving REC-IMG.A an acquired medical image IMG.A, of receiving or determining REC-DET-CV.A an actual classification value CV.A, of receiving or determining REC-DETCV.1 the first classification value CV.1 being different from the actual classification value CV.A and of applying APPL-GF.1 the first generative function GF.1 to the acquired medical image IMG.A are identical to the respective steps of the first embodiment displayed in FIG. 6. In particular, they can exhibit all advantageous features and implement the embodiments described therein.

A further step of this embodiment is receiving or determining REC-DET-CV.2 a second classification value CV.2 being different from the actual classification value CV.A and being different from the first classification value CV.1, wherein the second classification value CV.2 is a potential classification value of the anatomical structure within the acquired medical image IMG.A.

In this embodiment, the second classification value CV.2 is then also a real number between 0 and 1, as the actual classification value CV.A. In the alternative, if the actual classification value CV.A can be an element of a discrete set of potential classification value (e.g. a BI-RADS score), also the second classification value CV.2 could be selected or determined out of this discrete set.

In this embodiment, the second classification value CV.2 is determined based on the actual classification value CV.A by the computation unit ESYS.CU of the explanation system ESYS. In particular, the first classification value CV.1 is set to 0, and the second classification value CV.2 is set to 1, or vice versa. Alternatively, the second classification value CV.2 can be received with the interface ESYS.IF of the explanation system ESYS, for example, as a user input. The latter alternative is in particular useful to have an interactive explanation for the user, in particular in the area of teaching radiologists.

If the set of potential classification values is discrete and comparable, the first classification value CV.1 can be the next potential classification value being larger than the actual classification value CV.A, and the second classification value CV.2 can be the next potential classification value being smaller than the actual classification value CV.A, or vice versa. This setup enables to visualize why a certain actual classification value CV.A was assigned to the anatomical structure, and not a neighboring classification value.

A further step of the displayed embodiment is applying APPL-GF.2 a second generative function GF.2 to the acquired medical image IMG.A, thereby generating a second synthetic image IMG.S2. Here the second generative function GF.2 is based on the second classification value CV.2, and the second generative function GF.2 is configured to modify the anatomical structure to exhibit the second classification value CV.2.

In particular, the second generative function GF.2 is configured or trained to change the shape and/or the texture of the anatomical structure within the acquired medical image IMG.A, not changing the surrounding of the anatomical structure in the acquired medical image IMG.A, and so creating a second synthetic image IMG.S2 that differs from the acquired medical image IMG.A only insofar that the anatomical structure within the synthetic image IMG.S2 would be classified by the second classification value CV.2. In particular, the second synthetic image IMG.S2 does have the same dimensionality as the acquired medical image IMG.A, and the second synthetic image IMG.S2 does have the same size as the acquired medical image IMG.A measured in number of voxels with respect to every dimension.

Within this embodiment, to achieve this target, the second generative function GF.2 is based on a cycle-consistent generative adversarial algorithm. In particular, the second generative function GF.2 corresponds to a generative part of the cycle-consistent generative adversarial algorithm, in particular, to a different generative part of the cycle-consistent adversarial algorithm. In particular, the second generative function GF.2 is an artificial neural network.

In this embodiment, the second generative function GF.2 is selected from a generative function $GF^{(0)}$ configured to create synthetic images comprising an anatomical structure being classified with a classification value of 0, and a generative function $GF^{(1)}$ configured to create synthetic images comprising an anatomical structure being classified with a classification value of 1. In the alternative, if the actual classification value CV.A, the first classification value CV.1 and the second classification value CV.2 are from a discrete and orderable set, the second generative function GF.2 is selected from a generative function $GF^{(+)}$ configured to create synthetic images comprising an anatomical structure being classified with a classification value being one step larger than the classification value of the anatomical structure in the input image, and a generative function $GF^{(-)}$ configured to create synthetic images comprising an anatomical structure being classified with a classification value being one step smaller than the classification value of the anatomical structure in the input image. In particular, in both cases, the first generative function GF.1 and the second generative function GF.2 are chosen to be not identical.

Alternatively, the second classification value CV.2 can be used as an additional parameter for the second generative function GF.2.

The third embodiment furthermore comprises the step of determining DET-IMG.M a modified medical image IMG.M based on the acquired medical image IMG.A, the first synthetic image IMG.S1 and the second synthetic image.

In this embodiment, each voxel of the modified medical image IMG.M comprises a first intensity value, a second intensity value and a third intensity value. The first intensity value corresponds to the intensity value of the respective voxel of the acquired medical image IMG.A. The second intensity value corresponds to a voxel-wise difference of the modified medical image IMG.M and the first synthetic image IMG.S1. The third intensity value corresponds to a voxel-wise difference of the modified medical image IMG.M and the second synthetic image IMG.S2. Using the notations of FIG. 1, denoting by $x_m$ the modified medical image IMG.M, the modified medical image IMG.M is given voxel-wise by $x_m=(x, s_1-x, s_2-x)$ or $x_m=(x, |s_1-x|, |s_2-x|)$.

Furthermore, providing PROV-VIS the visualization comprises providing the modified medical image IMG.M. In this embodiment, the modified medica image IMG.M comprises three color channels, the first color channel relating to the first intensities and being a greyscale channel, the second color channel relating to a scale from transparent to red, and the third color channel relating to a scale from transparent to blue.

FIG. 9 schematically displays a potential outcome of the first and the second embodiment of FIG. 6 and FIG. 7.

FIG. 9 displays an acquired medical image IMG.A being a two-dimensional image containing an anatomical structure being a lesion. Furthermore, FIG. 9 displays an example for a first synthetic image IMG.S1 corresponding to a more malignant version of the lesion, since the boundary of the lesion is less regular than the boundary of the lesion within the acquired medical image IMG.A.

The acquired medical image IMG.A and the first synthetic image IMG.S1 are displayed spatially aligned, and form a potential visualization outcome of the first embodiment of FIG. 6. By the spatial alignment, a direct comparison is possible.

Furthermore, FIG. 9 displays a difference image IMG.D corresponding to a difference of the acquired medical image IMG.A and the first synthetic image IMG.S1. The difference image IMG.D has non-vanishing values in the voxels where the acquired medical image IMG.A and the first synthetic image IMG.S1 do not match, here, the non-vanishing values are located at the boundary of the lesion.

Additionally, FIG. 9 displays a modified image IMG.M. The modified image is based on the acquired medical image IMG.A, and displays the values of the difference image IMG.D in another channel (e.g., with another color). Alternatively, the modified image could comprise markers like arrows directing at the voxel areas where the difference image IMG.D has high values (corresponding to areas with large differences between the acquired medical image IMG.A and the first synthetic image IMG.S1.

FIG. 10 displays a further outcome of a method according to an embodiment of the invention, in particular, according to one of the embodiments of FIG. 6 to FIG. 8. The displayed data corresponds to the usage of the described method to actual medical data.

The acquired medical image IMG.A is here a two-dimensional image based on X-rays comprising an anatomical structure being a lesion. The lesion has an actual classification value CV.A of 0.73, which can be calculated by applying a classification function CF to the acquired medical image IMG.A. Here, the classification values are real numbers in the interval [0, 1] relating to the malignancy of the lesion.

Furthermore, a first synthetic image IMG.S1 and a second synthetic image IMG.S2 are displayed, which correspond to a more benign lesion and to a more malignant lesion. The first and the second synthetic image IMG.S1, IMG.S2 have been generated by way of the first and the second generative function GF.1, GF.2. Applying the classification function CF to the first synthetic image IMG.S1 results in a classification value of 0.37, and applying the classification function CF to the second synthetic image IMG.S2 results in a classification value of 0.93. It has to be noted that these calculated classification are not necessarily equivalent with the first and the second classification value CV.1, CV.2, because there can be deviations between the calculated classification value and the desired first and second classification value CV.1, CV.2 due to imperfect first and second generative functions GF.1, GF.2.

FIG. 11 displays further outcomes of a method according to an embodiment of the invention, in particular according to one of the embodiments of FIG. 6 to FIG. 8, for other example lesions. There are four different rows, each row relating to a different lesion. Furthermore, there are four columns. The first column comprises the respective acquired medical image IMG.A, the second column comprises the respective first synthetic image IMG.S1, the third column comprises the respective second synthetic image IMG.S2, and the third column comprises the respective modified medical image IMG.M FIG. 12 displays a comparison of different generative functions GF.1, GF.2 being used in the context of an embodiment of the invention, on six different lesions (corresponding to the six rows of images within FIG. 12).

The first column comprises the respective acquired medical mage IMG.A. The second column comprises modified medical images IMG.M based on cycle-consistent generative adversarial networks. The third column comprises modified medical images based on Shapley Additive Explanations. The fourth column comprises modified medical images based on DeepTaylor. The last column comprises modified medical images based on Layerwise Relevance Propagation.

FIG. 13 displays results of a study comparing the results of the proposed method based on different types of generative functions GF.1, GF.2. The study has been conducted as a double-blind, randomized in-house study, with eight participants having multi-year experience in the field of biomedical image processing. A questionnaire was used to evaluate the intuitive impression, meaningfulness with respect to typical signs of lung lesion malignancy, and overall image quality of modified medical image IMG.M based on the acquired medical image IMG.A.

The upper row shows an overall frequency distribution for the evaluation given by the participants, the upper row shows a comparison between cases with benign nodules (left) and malignant lung nodes (right). The left column relates to a rating of the intuitive impression, the middle column relates to meaningfulness in terms of typical criteria to rate malignancy and benignancy, and the right column refers to the overall image quality.

The first distribution DB.1 is based on generative functions GF.1, GF.2 based on cycle-consistent generative adversarial networks, the second distribution DB.2 on Deep Shapley Additive Explanations, the third distribution DB.3 on DeepTaylor, and the fourth distribution DB.4 on Layerwise Relevance Propagation.

FIG. 14 displays a flowchart of a first embodiment of a method for providing a first generative function GF.1.

The method comprises receiving TREC-T1 a first training image IMG.T1, the first training image IMG.T1 comprising a first training anatomical structure, the first training anatomical structure being classified by a first training classification value CV.T1. In this embodiment, the first training image IMG.T1 is a two-dimensional medical image based on X-rays. The first training image IMG.T1 comprises a lesion as anatomical structure, in particular, a lung nodule. The first training image IMG.T1 can be received by an interface TSYS.IF of a training system TSYS. The first training image IMG.T1 comprises 512×512 voxel, each voxel comprising at least one intensity value. The first training classification value CV.T1 is here a real number in the interval [0,1] classifying the malignancy of the lung nodule within the first training image IMG.T1.

A further step of the displayed embodiment is receiving or determining TREC-TDET-CV.1 a second training classification value CV.T1 being different from the first training classification value CV.T1, wherein the second training classification value CV.T2 is a potential classification value of the first anatomical structure within the first training medical image IMG.T1. In this embodiment, the second training classification value CV.T2 is also a real number in the interval [0,1] classifying malignancy of a lung nodule. In particular, the second training classification value CV.T2 can be determined based on the and the first training classification value CV.T1 similar to the determination of the first classification value CV.1 based on the actual classification value CV.A.

The method furthermore comprises applying TAPPL-GF.1-T1 the first generative function GF.1 to the first training image IMG.T1, thereby generating a modified first training image IMG.T1'. Here, the first generative function GF.1 is based on the second training classification value CV.T2. Using the notation introduced with respect to FIG. 3 to FIG. 5, the modified first training image IMG.T1' can be determined as t1=GF.1(t1, c2). The modified first training image IMG.T1' is a synthetic image, and has the same dimensionality and the same size as the first training image IMG.T1. In this embodiment, the modified first training image IMG.T1' is a two-dimensional synthetical image, comprising 512×512 voxels.

A further step of the displayed embodiment is receiving TREC-S1 a first input image IMG.S1, the first input image IMG.S1 comprising a first input anatomical structure, the first input anatomical structure being classified by the second training classification value CV.T2. In general, the first input image IMG.S1 has the same dimensionality and the same size as the first training image IMG.T1. In this embodiment, the first input image IMG.S1 is a two-dimensional medical image based on X-rays, comprising 512×512 voxels.

Further steps of the displayed method are applying TAP-PLDF.1-TS a first discriminative function DF.1 to the first input image IMG.S1, thereby generating a first discriminator value, and applying TAPPL-DF.1-T1' the first discriminative function DF.1 to the modified first training image IMG.T1', thereby generating a second discriminator value. In particular, a discriminator value corresponds to a real number in the interval [0,1] relating to the probability that the input image of the first discriminative function is a real medical image and not a synthetic image. In this embodiment, the first discriminative function DF.1 is furthermore based on the second training classification value CV.T2, but it is also possible to use a first discriminative function DF.1 that is not based on a classification value.

The next step of the displayed embodiment is adapting TADPT a parameter of the first generative function GF.1 and/or of the first discriminative function DF.1 based on an generative-adversarial loss function, wherein the generative-adversarial loss function is based on the first discriminator value and the second discriminator value.

In this embodiment, the following loss functions are used:

$$L^{(DF1)} \sim -\log DF_1(s_1,c_2) - \log[1-DF_1(GF_1(t_1,c_2),c_2)]$$

$$L^{(GF1)} \sim \log [1-DF_1(GF_1(t_1,c_2),c_2)]$$

In this embodiment, both the first generative function GF.1 and the first discriminative function DF.1 are artificial neural networks, with the edge weights of the artificial neural networks correspond to the adaptable parameters. The weights are adapted by minimizing the loss functions based on a gradient descent utilizing the backpropagation algorithm. In particular, the first generative function GF.1 and the first discriminative function DF.1 can comprise a convolutional layer.

The final step of the displayed method is providing TPROV the first generative function GF.1 and/or the first discriminative function DF.1. Providing the first generative function GF.1 and/or the first discriminative function DF.1 can comprise storing, displaying and/or transmitting the first generative function and/or the first discriminative function DF.1.

FIG. 15 displays a flowchart of a second embodiment of a method for providing a first generative function GF.1. The second embodiment comprises all steps of the first embodiment displayed in FIG. 14, all these steps can comprise the advantageous options or alternative features described in relation to FIG. 14.

The second embodiment furthermore comprises the step of applying APPL-GF.2-T1' a second generative function GF.2 to the modified first training image IMG.T1', thereby generating a comparison first training image IMG.T1", wherein the second generative function GF.2 is based on the first training classification value CV.T1. The comparison first training image IMG.T1" is a synthetic image, and has the same dimensionality and the same size as the first training image IMG.T1. In this embodiment, the comparison first training image IMG.T1" is a two-dimensional synthetical image, comprising 512×512 voxels.

In this embodiment, the step of adapting TADPT relates to a parameter of the first generative function GF.1 and/or of the second generative function GF.2 based on an cycle-consistency loss function. Here, the cycle-consistency loss function L.CC is based on a difference of the comparison first training image IMG.T1" and the first training image IMG.T1. Additionally, the step of adapting TADPT relates to a parameter of the first generative function GF.1 and/or of the first discriminative function DF.1 based on an generative-adversarial loss function, wherein the generative-adversarial loss function is based on the first discriminator value and the second discriminator value.

In this embodiment, the following loss functions are used:

$$L^{(DF1)} \sim -\log DF_1(s_1,c_2) - \log [1-DF_1(GF_1(t_1,c_2),c_2)]$$

$$L^{(GF1)} \sim \log [1-DF_1(GF_1(t_1,c_2),c_2)] + \|t_1 - GF_2(GF_1(t_1,c_2),c_1)\|_2$$

$$L^{(GF2)} \sim \|t_1 - GF_2(GF_1(t_1,c_2),c^1)\|_2$$

In this embodiment, the first generative function GF.1, the first discriminative function DF.1 and the second generative function GF.2 are artificial neural networks, with the edge weights of the artificial neural networks correspond to the adaptable parameters. The weights are adapted by minimizing the loss functions based on a gradient descent utilizing the backpropagation algorithm. In particular, the first generative function GF.1, the first discriminative function DF.1 and the second generative function GF.2. can comprise a convolutional layer.

FIG. 16 displays a flowchart of a third embodiment of a method for providing a first generative function GF.1. The third embodiment comprises all steps of the first embodiment displayed in FIG. 14, all these steps can comprise the advantageous options or alternative features described in relation to FIG. 14.

The third embodiment comprises receiving TREC-T2 a second training image IMG.T2, the second training image IMG.T2 comprising a second anatomical structure, the second anatomical structured being classified by the second training classification value CV.T2. This step is similar to the step of receiving TREC-T1 a first training image IMG.T1, and the second training image IMG.T2 can comprise all features and advantageous embodiments of the first training image IMG.T1.

A further step is applying TAPPL-GF.2-T2 a second generative function GF.2 to the second training image IMG.T2, thereby generating a modified second training image IMG.T2', wherein the second generative function GF.2 is based on the first training classification value CV.T1. This step is similar to the step of applying TAPPL-GF.2-T1 the first generative function GF.1 to the first training image IMG.T1.

A further step of the third embodiment is receiving TRECS2 a second input image IMG.S2, the second input image IMG.S2 comprising a second input anatomical structure, the second input anatomical structure being classified by the first training classification value CV.T1. This step is similar to the step of receiving TREC-S1 a first input image IMG.S1, and the second input image IMG.S2 can comprise all features and advantageous embodiments of the first input image IMG.S1.

Additional steps are applying TAPPL-DF.2-T2 a second discriminative function DF.2 to the second input image IMG.S2, thereby generating a third discriminator value, and applying TAPPL-DF.2-T2' the second discriminative function DF.2 to the modified second training image IMG.T1', thereby generating a fourth discriminator value.

In this embodiment, the step of adapting TADPT relates to a parameter of the second generative function GF.2 and/or of the second discriminative function DF.2 based on an generative-adversarial loss function, wherein the generative-adversarial loss function is based on the third discriminator value and the fourth discriminator value.

In this embodiment, the following loss functions are used:

$$L^{(DF1)} \sim -\log DF_1(s_1,c_2) - \log [1-DF_1(GF_1(t_1,c_2),c_2)]$$

$$L^{(GF1)} \sim \log [1-DF_1(GF_1(t_1,c_2),c_2)]$$

$$L^{(DF2)} \sim -\log DF_2(s_2,c_1) - \log [1-DF_2(GF_2(t_2,c_1),c_1)]$$

$$L^{(GF2)} \sim \log [1-DF_2(GF_2(t_2,c_1),c_1)]$$

In this embodiment, the generative functions GF.1, GF.2 and the discriminative functions DF.1, DF.2 are artificial neural networks, with the edge weights of the artificial neural networks correspond to the adaptable parameters. The weights are adapted by minimizing the loss functions based on a gradient descent utilizing the backpropagation algorithm. In particular, the generative function GF.1, GF.2 and the discriminative functions DF.1, DF.2 can comprise a convolutional layer.

FIG. 17 displays a flowchart of a fourth embodiment of a method for providing a first generative function GF.1. The second embodiment comprises all steps of the first embodiment displayed in FIG. 14, and the additional steps of the second embodiment and the third embodiment displayed in FIGS. 15 and Z3. All these steps can comprise the advantageous options or alternative features described in relation to FIG. 14 to FIG. 16.

The fourth embodiment furthermore comprises applying TAPPL-GF.1-T2' the first generative function GF.1 to the modified second training image IMG.T2', thereby generating a comparison second training image IMG.T2", wherein the first generative function GF.1 is based on the second training classification value CV.T2. The step of applying TAPPL-GF.1-T2' the first generative function GF.1 to the modified second training image IMG.T2' is similar to the step of applying TAPPL-GF.2-T1' the second generative function GF.2 to the modified first training image IMG.T1', and the comparison second training image IMG.T2" can comprise all features and advantageous embodiments of the comparison first training image IMG.T1".

In this embodiment, the step of adapting TADPT relates to a parameter of the first generative function GF.1 and/or of the second generative function GF.2 based on a cycle-consistency loss function, wherein the cycle-consistency loss function is based on a difference of the comparison second training image IMG.T2" and the second training image IMG.T2.

In this embodiment, the following loss functions are used:

$$L^{(DF1)} \sim -\log DF_1(s_1,c_2) - \log [1-DF_1(GF_1(t_1,c_2),c_2)]$$

$$L^{(DF2)} \sim -\log DF_2(s_2,c_1) - \log [1-DF_2(GF_2(t_2,c_1),c_1)]$$

$$L^{(GF1)} \sim \log [1-DF_1(GF_1(t_1,c_2),c_2)] + \|t_1 - GF_2(GF_1(t_1,c_2),c_1)\|_2 + \|t_2 - GF_1(GF_2(t_2,c_1),c_2)\|_2$$

$$L^{(GF2)} \sim \log [1-DF2(GF_2(t_2,c_1),c_1)] + \|t_1 - GF_2(GF_1(t_1,c_2),c_1)\|_2 + \|t_2 - GF_1(GF_2(t_2,c_1),c_2)\|_2$$

It would be also possible to use only one of the norm terms in the loss functions for the first and the second generative function GF.1, GF.2. In this embodiment, the generative functions GF.1, GF.2 and the discriminative functions DF.1, DF.2 are artificial neural networks, with the edge weights of the artificial neural networks correspond to the adaptable parameters. The weights are adapted by minimizing the loss functions based on a gradient descent utilizing the backpropagation algorithm. In particular, the generative function GF.1, GF.2 and the discriminative functions DF.1, DF.2 can comprise a convolutional layer.

FIG. 18 displays an explanation system ESYS, a medical imaging system MISYS and a training system TSYS. The explanation system ESYS comprises an input interface ESYS.IIF, an output interface ESYS.OIF, a computation unit ESYS.CU and a memory unit ESYS.MU. The medical imaging system MISYS comprises the training system TSYS. The training system TSYS comprises an input interface TSYS.IIF, an output interface TSYS.OIF, a computation unit TSYS.CU and a memory unit TSYS.MU.

The explanation system ESYS and/or the training system TSYS can be a (personal) computer, a workstation, a virtual machine running on host hardware, a microcontroller, or an integrated circuit. In particular, the explanation system ESYS and/or the training system TSYS can be mobile devices, e.g. a smartphone or a tablet. As an alternative, the explanation system ESXS and/or the training system TSYS can be a real or a virtual group of computers (the technical term for a real group of computers is "cluster", the technical term for a virtual group of computers is "cloud").

The explanation system ESYS and/or the training system TSYS can be connected to a network NETW. The network can be realized as a LAN (acronym for "local area network"), in particular a WiFi network, or any other local connection, e.g. via Bluetooth or USB (acronym for "universal serial bus"). The network can alternatively also be realized as a VPN (acronym for "virtual private network").

An input interface ESYS.IIF, TSYS.IIF and an output interface ESYS.OIF, TSYS.OIF can be embodied as a hardware interface or as a software interface (e.g. PCIBus, USB or Firewire). In particular, the input interface ESYS.IIF, TSYS.IIF and/or the output interface ESYS.OIF, TSYS.OIF can be a combination of several other interfaces, in particular, the input interface ESYS.IIF, TSYS.IIF and/or the output interface ESYS.OIF, TSYS.OIF can comprise one or more interfaces as subcomponent. The input interface ESYS.IIF, TSYS.IIF and the output interface ESYS.OIF, TSYS.OIF can be identical. In particular, the output interface ESYS.OIF of the explanation system ESYS can be a display.

In general, a computation unit ESYS.CU, TSYS.CU can comprise hardware elements and software elements, for example a microprocessor, a CPU (acronym for "central processing unit"), a GPU (acronym for "graphical processing unit"), a field programmable gate array (an acronym is "FPGA") or an ASIC.(acronym for "application-specific integrated circuit"). The computation unit ESYS.CU, TSYS.CU can be configured for multithreading, i.e. the computation unit ESYS.CU, TSYS.CU can host different computation processes at the same time, executing the either in parallel or switching between active and passive computation processes. In particular, the computation unit ESYS.CU, TSYS.CU can be a combination of several other computation units, in particular, the computation unit ESYS.CU, TSYS.CU can comprise one or more computation units as subcomponents. A memory unit ESYS.MU, TSYS.MU can be e.g. non-permanent main memory (e.g. random access memory) or permanent mass storage (e.g. hard disk, USB stick, SD card, solid state disk).

The invention, its embodiments and embodiments can also be described by the following clauses, which all form part of the disclosure:

Clause 1: A computer-implemented method for providing a classification explanation, comprising:
receiving REC-IMG.A an acquired medical image IMG.A corresponding to an examination volume,
receiving or determining REC-DET-CV.A an actual classification value CV.A, in particular by applying a classification function CF to the acquired medical image IMG.A to generate the actual classification value CV.A,
wherein the actual classification value CV.A classifies an anatomical structure within the acquired medical image IMG.A,
receiving or determining REC-DET-CV.1 a first classification value CV.1 being different from the actual classification value CV.A,
wherein the first classification value CV.1 is a potential classification value of the anatomical structure within the acquired medical image IMG.A,
applying APPL-GF.1 a first generative function GF.1 to the acquired medical image IMG.A, thereby generating a first synthetic image IMG.S1,
wherein the first generative function GF.1 is based on the first classification value CV.1,
wherein the first generative function GF.1 is configured to modify the anatomical structure to exhibit the first classification value CV.1,
providing PROV-VIS a visualization based on the acquired medical image IMG.A and the first synthetic image IMG.S1.

Clause 2: A computer-implemented method for providing a classification explanation, comprising:
receiving REC-IMG.A an acquired medical image IMG.A corresponding to an examination volume,
applying a classification function CF to the acquired medical image IMG.A, thereby generating an actual classification value CV.A classifying an anatomical structure within the acquired medical image IMG.A,
receiving or determining REC-DET-CV.1 a first classification value CV.1 being different from the actual classification value CV.A,
wherein the first classification value CV.1 is a potential classification value of the anatomical structure within the acquired medical image IMG.A,
applying APPL-GF.1 a first generative function GF.1 to the acquired medical image IMG.A, thereby generating a first synthetic image IMG.S1,
wherein the first generative function GF.1 is based on the first classification value CV.1,
wherein the first generative function GF.1 is configured to modify the anatomical structure to exhibit the first classification value CV.1,
providing PROV-VIS a visualization based on the acquired medical image IMG.A and the first synthetic image IMG.S1.

Clause 3: A computer-implemented method for providing a classification explanation, comprising:
receiving REC-IMG.A an acquired medical image IMG.A corresponding to an examination volume, the acquired medical image IMG.A comprising an anatomical structure, in particular wherein the anatomical structure is classified by an actual classification value CV.A, receiving a first classification value CV.1, wherein the first classification value CV.1 is a potential classification value of the anatomical structure within the acquired medical image IMG.A, applying APPL-GF.1 a first generative function GF.1 to the acquired medical image IMG.A, thereby generating a first synthetic image IMG.S1, wherein the first generative function GF.1 is based on the first classification value CV.1, wherein the first generative function GF.1 is configured to modify the anatomical structure to exhibit the first classification value CV.1, providing PROV-VIS a visualization based on the acquired medical image IMG.A and the first synthetic image IMG.S1.

Clause 4: The method according to one of the preceding clauses, wherein the first generative function GF.1 is based on the first classification value CV.1 by the first classification value CV.1 being an input value for the first generative function GF.1 and/or by the first generative function GF.1 being chosen from a plurality of generative functions GF.1, GF.2 based on the first classification value CV.1.

Clause 5: The method according to one of the preceding clauses, wherein the first generative function GF.1 is configured to generate synthetic images comprising a synthetic structure, the synthetic structure being similar to the anatomical structure, but exhibiting the first classification value CV.1.

Clause 6: The method according to one of the preceding clauses, furthermore comprising determining DET-IMG.M a modified medical image IMG.M based on the acquired medical image IMG.A and the first synthetic image IMG.S1, wherein providing PROV-VIS the visualization comprises providing the modified medical image IMG.M.

Clause 7: The method according to clause 6, wherein the modified medical image IMG.M is based on a difference of the first synthetic image IMG.S1 and the acquired medical image IMG.A.

Clause 8: The method according to clause 7, wherein each voxel of the modified medical image IMG.M comprises a first intensity value and a second intensity value, wherein the first intensity value corresponds to an intensity value of a corresponding voxel of the acquired medical image IMG.A, and wherein the second intensity value corresponds to an intensity value of a corresponding voxel of the difference of the first synthetic image IMG.S1 and the acquired medical image IMG.A.

Clause 9: The method according to one of the preceding clauses, wherein the actual classification value CV.A and the first classification value CV.1 are comparable, wherein the first classification value CV.1 is smaller than the actual classification value CV.A, or wherein the first classification value CV.1 is larger than the actual classification value CV.A.

Clause 10: The method according to one of the preceding clauses, wherein the actual classification value CV.A and the first classification value CV.1 are elements of a plurality of possible classification values of the structure, the plurality of possible classification values being a discrete and comparable set, and wherein the first classification value CV.1 is the smallest classification value from the plurality of possible classification values being larger than the actual classification value CV.A, or wherein the first classification value CV.1 is the largest classification value from the plurality of possible classification values being smaller than the actual classification value CV.A.

Clause 11: The method according to one of the preceding clauses, furthermore comprising:

receiving or determining REC-DET-CV.2 a second classification value CV.2 being different from the actual classification value CV.A and being different from the first classification value CV.1, wherein the second classification value CV.2 is a potential classification value of the anatomical structure within the acquired medical image IMG.A, applying APPL-GF.1 a second generative function GF.2 to the acquired medical image IMG.A, thereby generating a second synthetic image IMG.S2, wherein the second generative function GF.2 is based on the second classification value CV.2, wherein the second generative function GF.2 is configured to modify the anatomical structure to exhibit the second classification value CV.2, wherein the visualization is furthermore based on the second synthetic image IMG.S2.

Clause 12: The method according to clause 11, wherein the second generative function GF.2 is based on the second classification value CV.2 by the second classification value CV.2 being an input value for the second generative function GF.2 and/or by the second generative function GF.2 being chosen from a plurality of generative functions GF.1, GF.2 based on the second classification value CV.2.

Clause 13: The method according to clause 11 or clause 12, furthermore comprising:

determining DET-IMG.M a modified medical image IMG.M based on the acquired medical image IMG.A, the first synthetic image IMG.S1 and the second synthetic image IMG.S2, wherein providing the visualization comprises providing the modified medical image IMG.M.

Clause 14: The method according to clause 13, wherein the modified medical image is based on the difference of the first synthetic image and the medical image, as well as on the difference of the second synthetic image and the medical image.

Clause 15. The method according to clause 14, wherein each voxel of the modified medical image IMG.M comprises a first intensity value, a second intensity value and a third intensity value, wherein the first intensity value corresponds to an intensity value of a corresponding voxel of the acquired medical image IMG.A, wherein the second intensity value corresponds to an intensity value of a corresponding voxel of the difference of the first synthetic image IMG.S1 and the acquired medical image IMG.A, and wherein the third intensity value corresponds to an intensity value of a corresponding voxel of the difference of the second synthetic image IMG.S2 and the acquired medical image IMG.A.

Clause 16: The method according to one of the clauses 11 to 15, wherein the actual classification value CV.A, the first classification value CV.1 and the second classification value CV.2 are comparable, wherein the first classification value CV.1 is smaller than the actual classification value CV.A, and wherein the second classification value CV.2 is larger than the actual classification value CV.A.

Clause 17: The method according to clause 16, wherein the actual classification value CV.A, the first classification value CV.1 and the second classification value CV.2 are elements of a plurality of possible classification values of the structure, the plurality of possible classification values being a discrete and comparable set, wherein the first classification value CV.1 is the largest classification value from the plurality of possible classification values being smaller than the actual classification value CV.A, and wherein the second classification value CV.2 is the smallest classification value from the plurality of possible classification values being larger than the actual classification value CV.A.

Clause 18: The method according to one of the preceding clauses, wherein the anatomical structure in the acquired medical image IMG.A is a lesion,
wherein the actual classification value CV.A, the first classification value CV.1 and/or the second classification value CV.2 correspond to a benignancy and/or a malignancy of the lesion.

Clause 19: The method according to clause 18, wherein in the case of the actual classification value CV.A corresponds to a benign lesion, the first classification value CV.1 and/or the second classification value CV.2 correspond to a malignant lesion, and
wherein in the case of the actual classification value CV.A corresponds to a malignant lesion, the first classification value CV.1 and/or the second classification value CV.2 correspond to a benign lesion.

Clause 20: The method according to Clause 18, wherein the actual classification value CV.A, the first classification value CV.1 and/or the second classification value CV.2 correspond to a degree of benignancy and/or malignancy of the lesion, wherein the first classification value CV.1 corresponds to a degree being one level below the actual classification value CV.A, and/or wherein the second classification value CV.2 corresponds to a degree being one level above the actual classification value CV.A.

Clause 21: The method according to one of the preceding clauses, wherein the first generative function GF.1 and/or the second generative function GF.2 are based on a generative adversarial algorithm, in particular, based on a cycle-consistent generative adversarial algorithm.

Clause 22: The method according to Clause 21, wherein the first generative function GF.1 is the generative part of a first generative adversarial algorithm, and/or wherein the second generative function GF.2 is the generative part of a second generative adversarial algorithm.

Clause 23: The method according to Clause 21, wherein the first generative function GF.1 is the generative part of a first generative adversarial algorithm, wherein the second generative function GF.2 is the generative part of a second generative adversarial algorithm, and wherein the first generative adversarial algorithm and the second generative adversarial algorithm form a cycle-consistent generative adversarial algorithm.

Clause 24: The method according to one of the Clauses 21 to 23, wherein the first generative function GF.1 and/or the second generative function GF.2 are artificial neural networks.

Clause 25: The method according to one of the clauses 21 to 24, wherein the classification function CF is based on the generative adversarial algorithm, in particular, based on the cycle-consistent generative adversarial algorithm.

Clause 26: The method according to clause 25, wherein the classification function CF is based on the discriminative part of the generative adversarial algorithm or the cycle-consistent generative adversarial algorithm.

Clause 27: The method according to one of the preceding clauses, wherein the classification function is an artificial neural network, in particular, wherein the classification function is a deep artificial neural network, in particular, wherein the classification function is a convolutional deep neural network.

Clause 28: An explanation system ESYS for providing a classification explanation, comprising an input interface ESYS.IIF, an output interface ESYS.OIF and a computation unit ESYS.CU,
wherein the input interface ESYS.IIF is configured for receiving REC-IMG.A an acquired medical image IMG.A corresponding to an examination volume,
wherein the input interface ESYS.IIF and/or the computation unit ESYS.CU are configured for receiving or determining REC-DET-CV.A an actual classification value CV.A, in particular by applying a classification function CF to the acquired medical image IMG.A to generate the actual classification value CV.A, wherein the actual classification value CV.A classifies an anatomical structure within the acquired medical image IMG.A,
wherein the input interface ESYS.IIF or the computation unit ESYS.CU are configured for receiving or determining REC-DET-CV.1 a first classification value CV.1 being different from the actual classification value CV.A,
wherein the first classification value CV.1 is a potential classification value of the anatomical structure within the acquired medical image IMG.A,
wherein the computation unit ESYS.CU is configured for applying APPL-GF.1 a first generative function GF.1 to the acquired medical image IMG.A, thereby generating a first synthetic image IMG.S1,
wherein the first generative function GF.1 is based on the first classification value CV.1,
wherein the first generative function GF.1 is configured to modify the anatomical structure to exhibit the first classification value CV.1,
wherein the output interface ESYS.IIF is configured for providing PROV-VIS a visualization based on the acquired medical image IMG.A and the first synthetic image IMG.S1.

Clause 29: An explanation system ESYS for providing a classification explanation, comprising an input interface ESYS.IIF, an output interface ESYS.OIF and a computation unit ESYS.CU,
wherein the input interface ESYS.IIF is configured for receiving REC-IMG.A an acquired medical image IMG.A corresponding to an examination volume,
wherein the computation unit ESYS.CU is configured for applying a classification function CF to the acquired medical image IMG.A, thereby generating an actual classification value CV.A classifying an anatomical structure within the acquired medical image IMG.A,
wherein the input interface ESYS.IIF and/or the computation unit ESYS.CU are configured for receiving or determining REC-DET-CV.1 a first classification value CV.1 being different from the actual classification value CV.A,
wherein the first classification value CV.1 is a potential classification value of the anatomical structure within the acquired medical image IMG.A,
wherein the computation unit ESYS.CU is configured for applying APPL-GF.1 a first generative function GF.1 to the acquired medical image IMG.A, thereby generating a first synthetic image IMG.S1, wherein the first generative function GF.1 is based on the first classification value CV.1, wherein the first generative function GF.1 is configured to modify the anatomical structure to exhibit the first classification value CV.1, wherein the output interface ESYS.OIF is configured for providing PROV-VIS a visualization based on the acquired medical image IMG.A and the first synthetic image IMG.S1.

Clause 30: An explanation system ESYS for providing a classification explanation, comprising an input interface ESYS.IIF, an output interface ESYS.OIF and a computation unit ESYS.CU, wherein the input interface ESYS.IIF is configured for receiving REC-IMG.A an acquired medical image IMG.A corresponding to an examination volume, the acquired medical image IMG.A comprising an anatomical structure, in particular wherein the anatomical structure is classified by an actual classification value CV.A, wherein the input interface ESYS.IIF is configured for receiving a first classification value CV.1, wherein the first classification value CV.1 is a potential classification value of the anatomical structure within the acquired medical image IMG.A, wherein the computation unit ESYS.CU is configured for applying APPL-GF.1 a first generative function GF.1 to the acquired medical image IMG.A, thereby generating a first synthetic image IMG.S1, wherein the first generative function GF.1 is based on the first classification value CV.1, wherein the first generative function GF.1 is configured to modify the anatomical structure to exhibit the first classification value CV.1, wherein the output interface ESYS.OIF is configured for providing PROV-VIS a visualization based on the acquired medical image IMG.A and the first synthetic image IMG.S1.

Clause 31: The explanation system ESYS according to one of the clauses 28 to 30, furthermore configured to execute the method according to one of the clauses 1 to 27.

Clause 32: A medical imaging system, comprising an explanation system ESYS according to one of the clauses 28 to 31.

Clause 33: A computer-implemented method for providing a first generative function GF.1 comprising:

receiving TREC-T1 a first training image IMG.T1, the first training image IMG.T1 comprising a first training anatomical structure, the first training anatomical structure being classified by a first training classification value CV.T1, receiving or determining TREC-TDET-CV.1 a second training classification value CV.T2 being different from the first training classification value CV.T1, wherein the second training classification value CV.T2 is a potential classification value of the first anatomical structure within the first training medical image IMG.T1, applying TAPPL-GF.1-T1 a first generative function GF.1 to the first training image IMG.T1, thereby generating a modified first training image IMG.T1', wherein the first generative function GF.1 is based on the second training classification value CV.T2, receiving TREC-S1 a first input image IMG.S1, the first input image IMG.S1 comprising a first input anatomical structure, the first input anatomical structure being classified by the second training classification value CV.T2, applying TAPPL-DF.1-TS a first discriminative function DF.1 to the first input image IMG.S1, thereby generating a first discriminator value, applying TAPPL-DF.1-T1' the first discriminative function DF.1 to the modified first training image IMG.T1', thereby generating a second discriminator value, adapting TADPT a parameter of the first generative function GF.1 and/or of the first discriminative function DF.1 based on an generative-adversarial loss function, wherein the generative-adversarial loss function is based on the first discriminator value and the second discriminator value, providing TPROV the first generative function GF.1 and/or the first discriminative function DF.1.

Clause 34: The method according to Clause 33, furthermore comprising:

applying APPL-GF.2-T1' a second generative function GF.2 to the modified first training image IMG.T1', thereby generating a comparison first training image IMG.T1", wherein the second generative function GF.2 is based on the first training classification value CV.T1, adapting TADPT a parameter of the first generative function GF.1 and/or of the second generative function DF.2 based on an cycle-consistency loss function, wherein the cycle-consistency loss function is based on a difference of the comparison first training image IMG.T1" and the first training image IMG.T1.

Clause 35: The method according to Clause 33 or Clause 34, furthermore comprising:

receiving TREC-T2 a second training image IMG.T2, the second training image IMG.T2 comprising a second anatomical structure, the second anatomical structured being classified by the second training classification value CV.T2, applying TAPPL-GF.2-T2 a second generative function GF.2 to the second training image IMG.T2, thereby generating a modified second training image IMG.T2', wherein the second generative function GF.2 is based on the first training classification value CV.T1, receiving TREC-S2 a second input image IMG.S2, the second input image IMG.S2 comprising a second input anatomical structure, the second input anatomical structure being classified by the first training classification value CV.T1, applying TAPPL-DF.2-T2 a second discriminative function DF.2 to the second input image IMG.S2, thereby generating a third discriminator value, applying TAPPL-DF.2-T2' the second discriminative function DF.2 to the modified second training image IMG.T2', thereby generating a fourth discriminator value, adapting a parameter of the second generative function GF.2 and/or of the second discriminative function DF.2 based on an generative-adversarial loss function, wherein the generative-adversarial loss function is based on the third discriminator value and the fourth discriminator value.

Clause 36: The method according to Clause 35, furthermore comprising:

applying APPL-GF.2 the first generative function GF.1 to the modified second training image IMG.T2', thereby generating a comparison second training image IMG.T2", wherein the first generative function GF.1 is based on the second training classification value CV.T2, adapting a parameter of the first generative function GF.1 and/or of the second generative function DF.2 based on a cycle-consistency loss function, wherein the cycle-consistency loss function is based on a difference of the comparison second training image IMG.T2" and the second training image IMG.T2.

Clause 37: The method according to one of the clauses 33 to 36, wherein the parameter of the first generative function GF.1 and/or of the second generative function GF.2 is furthermore adapted based on a classification loss function, wherein the classification loss function is based on a difference of the second classification value CV.2 and the result of using a classification function CF on the modified first medical image IMG.T1' and/or wherein the classification loss function is based on a difference of the first classification value CV.1 and the result of using the classification function CF on the modified second medical image IMG.T2'.

Clause 38: A training system TSYS for providing a first generative function GF.1, comprising an interface TSYS.IF and a computation unit TSYS.CU,
- wherein the interface TSYS.IF is configured for receiving TREC-T1 a first training image IMG.T1, the first training image IMG.T1 comprising a first training anatomical structure, the first training anatomical structure being classified by a first training classification value CV.T1,
- wherein the interface TSYS.IF and/or the computation unit TSYS.CU are configured for receiving or determining TREC-TDET-CV.1 a second training classification value CV.T2 being different from the first training classification value CV.T1, wherein the second training classification value CV.T2 is a potential classification value of the first anatomical structure within the first training medical image IMG.T1,
- wherein the computation unit TSYS.CU is configured for applying TAPPL-GF.1-T1 a first generative function GF.1 to the first training image IMG.T1, thereby generating a modified first training image IMG.T1', wherein the first generative function GF.1 is based on the second training classification value CV.T2,
- wherein the interface TSYS.IF is configured for receiving TREC-S1 a first input image IMG.S1, the first input image IMG.S1 comprising a first input anatomical structure, the first input anatomical structure being classified by the second training classification value CV.T2,
- wherein the computation unit TSYS.CU is configured for applying TAPPL-DF.1-TS a first discriminative function DF.1 to the first input image IMG.S1, thereby generating a first discriminator value,
- wherein the computation unit TSYS.CU is configured for applying TAPPL-DF.1-T1' the first discriminative function DF.1 to the modified first training image IMG.T1', thereby generating a second discriminator value,
- wherein the computation unit TSYS.CU is configured for adapting TADPT a parameter of the first generative function GF.1 and/or of the first discriminative function DF.1 based on an generative-adversarial loss function, wherein the generative-adversarial loss function is based on the first discriminator value and the second discriminator value,
- wherein the interface TSYS.IF is configured for providing TPROV the first generative function GF.1 and/or the first discriminative function DF.1.

Clause 39: The method according to one of the clauses 1 to 27, wherein the first generative function GF.1 has been provided by a method according to one of the clauses 33 to 27.

Clause 40: A system comprising an explanation system ESYS according to one of the clauses 28 to 30 or a medical imaging system according to clause 31, and a training system TSYS according to clause 38, wherein the first generative function GF.1 provided by the training system TSYS is used within the explanation system ESYS.

Clause 41: A computer program product comprising instructions which, when the program is executed by an explanation system ESYS, cause the explanation system ESYS to carry out the method according to one of the clauses 1 to 27 or clause 39, and/or comprising instructions which, when the program is executed by a training system ISYS, cause the training system ISYS to carry out the method according to one of the clauses 33 to 37.

Clause 42: A computer-readable medium comprising instructions which, when executed by an explanation system ESYS, cause the explanation system ESYS to carry out the method according to one of the clauses 1 to 27 or clause 39; and/or comprising instructions which, when executed by a training system ISYS, cause the training system ISYS to carry out the method according to one of the clauses 33 to 37.

Clause 43: A computer program product comprising instructions which, when the program is executed by an explanation system ESYS, cause the explanation system ESYS to carry out the method according to one of the clauses 1 to 27 or clause 39.

Clause 44: A computer program product comprising instructions which, when the program is executed by a training system ISYS, cause the training system ISYS to carry out the method according to one of the clauses 33 to 37.

Clause 45: A computer-readable medium comprising instructions which, when executed by an explanation system ESYS, cause the explanation system ESYS to carry out the method according to one of the clauses 1 to 27 or clause 39.

Clause 46: A computer-readable medium instructions which, when executed by a training system ISYS, cause the training system ISYS to carry out the method according to one of the clauses 33 to 37.

Wherever not already described explicitly, individual embodiments, or their individual embodiments and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing a classification explanation, comprising:
   receiving or determining an actual classification value, the actual classification value classifying an anatomical structure within an acquired medical image, the acquired medical image corresponding to an examination volume;
   receiving or determining a first classification value, different from the actual classification value, the first classification value being a first potential classification value of the anatomical structure within the acquired medical image, each of the actual classification value and the first classification value being related to a classification of the same anatomical structure, and the anatomical structure having at least two potential classification values;
   applying a first generative function to the acquired medical image to generate a first synthetic image, the first generative function being based on the first classification value, and the first generative function being configured to modify the anatomical structure to exhibit the first classification value; and
   providing a visualization based on the acquired medical image and the first synthetic image.

2. The method of claim 1, further comprising:
   determining a modified medical image based on the acquired medical image and the first synthetic image, the providing of the visualization including providing the modified medical image.

3. The method of claim 2, wherein the modified medical image is based on a difference of the first synthetic image and the acquired medical image.

4. The method of claim 3, wherein each voxel of the modified medical image includes a first intensity value and a second intensity value, the first intensity value corresponding to an intensity value of a corresponding voxel of the acquired medical image, and the second intensity value corresponding to an intensity value of a corresponding voxel of the difference of the first synthetic image and the acquired medical image.

5. The method of claim 2, wherein the actual classification value and the first classification value are among the at least two potential classification values of the anatomical structure, the at least two potential classification values being a discrete set, and at least one of:
   the first classification value being a smallest classification value from among a first subset of the at least two potential classification values, and each among the first subset of the at least two potential classification values being larger than the actual classification value, or
   the first classification value being a largest classification value from among a second subset of the at least two potential classification values, each among the second subset of the at least two potential classification values being smaller than the actual classification value.

6. The method of claim 2, further comprising:
   receiving or determining a second classification value, the second classification value being different from both the actual classification value and the first classification value, the second classification value being a second potential classification value of the anatomical structure within the acquired medical image; and applying a second generative function to the acquired medical image to generate a second synthetic image, the second generative function being based on the second classification value, the second generative function being configured to modify the anatomical structure to exhibit the second classification value, and the visualization is based on the acquired medical image, the first synthetic image and the second synthetic image.

7. The method of claim 6, wherein
the first classification value is smaller than the actual classification value, and
the second classification value is larger than the actual classification value.

8. The method of claim 6, wherein
the anatomical structure in the acquired medical image is a lesion; and
at least one among the actual classification value, the first classification value or the second classification value corresponds to at least one of:
a benignancy of the lesion, or
a malignancy of the lesion.

9. The method of claim 1, wherein the actual classification value and the first classification value are among the at least two potential classification values of the anatomical structure, the at least two potential classification values being a discrete set, and one of:
the first classification value being a smallest classification value from among a first subset of the at least two potential classification values, and each among the first subset of the at least two potential classification values being larger than the actual classification value, or the first classification value being a largest classification value from among a second subset of the at least two potential classification values, and each among the second subset of the at least two potential classification values being smaller than the actual classification value.

10. The method of claim 1, further comprising:
receiving or determining a second classification value, the second classification value being different from both the actual classification value and the first classification value, the second classification value being a second potential classification value of the anatomical structure within the acquired medical image; and
applying a second generative function to the acquired medical image to generate a second synthetic image, the second generative function being based on the second classification value, the second generative function being configured to modify the anatomical structure to exhibit the second classification value, and the visualization being based on the acquired medical image, the first synthetic image and the second synthetic image.

11. The method of claim 10, wherein
the first classification value is smaller than the actual classification value; and
the second classification value is larger than the actual classification value.

12. The method of claim 11, wherein
the at least two potential classification values includes at least three potential classification values;
the actual classification value, the first classification value and the second classification value are among the at least three potential classification values of the anatomical structure, the at least three potential classification values being a discrete set;
the first classification value is a largest classification value from among a first subset of the at least three potential classification values, and each among the first subset of the at least three potential classification values being smaller than the actual classification value; and
the second classification value is a smallest classification value from among a second subset of the at least three potential classification values, and each among the second subset of the at least three potential classification values being larger than the actual classification value.

13. The method of claim 10, wherein
the anatomical structure in the acquired medical image is a lesion; and
at least one among the actual classification value, the first classification value or the second classification value corresponds to at least one of:
a benignancy of the lesion, or
a malignancy of the lesion.

14. The method of claim 10, wherein at least one among the first generative function or the second generative function is based on a generative adversarial algorithm.

15. The method of claim 14, wherein at least one among the first generative function or the second generative function is based on a cycle-consistent generative adversarial algorithm.

16. A non-transitory computer-readable medium storing instructions which, when executed by at least one processor, cause the at least one processor to carry out the method of claim 1.

17. The method of claim 1, wherein the receiving or determining of the actual classification value includes applying a classification function to the acquired medical image, to generate the actual classification value.

18. The method of claim 1, wherein the first generative function is configured to output the first synthetic image based on both the acquired medical image and the first classification value being input to the first generative function.

19. An explanation system for providing a classification explanation, comprising:
at least one processor configured to cause the explanation system to
receive or determine an actual classification value, the actual classification value classifying an anatomical structure within an acquired medical image, the acquired medical image corresponding to an examination volume,
receive or determine a first classification value, different from the actual classification value, the first classification value being a potential classification value of the anatomical structure within the acquired medical image, each of the actual classification value and the first classification value being related to a classification of the same anatomical structure, and the anatomical structure having at least two potential classification values,
apply a first generative function to the acquired medical image to generate a first synthetic image, the first generative function being based on the first classification value, and first generative function being configured to modify the anatomical structure to exhibit the first classification value; and an output interface configured to provide a visualization based on the acquired medical image and the first synthetic image.

20. A medical imaging system, comprising the explanation system of claim 19.

21. The explanation system of claim 19, wherein the at least one processor is configured to cause the explanation system to receive or determine the actual classification value by applying a classification function to the acquired medical image to generate the actual classification value.

* * * * *